United States Patent
Ozkucur et al.

(10) Patent No.: US 11,423,677 B2
(45) Date of Patent: *Aug. 23, 2022

(54) AUTOMATIC DETECTION AND POSITIONING OF POLE-LIKE OBJECTS IN 3D

(71) Applicant: HERE Global B.V., Eindhoven (NL)

(72) Inventors: Nezih Ergin Ozkucur, Chicago, IL (US); Fangning He, Chicago, IL (US); David Doria, Oak Park, IL (US); Engin Burak Anil, Mount Prospect, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/079,107

(22) Filed: Oct. 23, 2020

(65) Prior Publication Data

US 2021/0042500 A1 Feb. 11, 2021

Related U.S. Application Data

(63) Continuation of application No. 16/227,722, filed on Dec. 20, 2018, now Pat. No. 10,846,511.

(51) Int. Cl.
*G06V 20/64* (2022.01)
*G06T 7/73* (2017.01)
(Continued)

(52) U.S. Cl.
CPC .......... *G06V 20/64* (2022.01); *G06K 9/6215* (2013.01); *G06K 9/6228* (2013.01); *G06T 7/75* (2017.01);
(Continued)

(58) Field of Classification Search
CPC ............ G06K 9/00201; G06K 9/4638; G06K 9/00791; G06K 9/6228; G06K 9/6215;
(Continued)

(56) References Cited

U.S. PATENT DOCUMENTS

| 8,488,877 B1 | 7/2013 | Owechko et al. |
| 8,818,031 B1 | 8/2014 | Kelly |
| 2007/0076920 A1* | 4/2007 | Ofek ............... G06T 3/4038 382/113 |

(Continued)

FOREIGN PATENT DOCUMENTS

| CN | 106127153 A | 11/2016 |
| EP | 3290952 A1 | 3/2018 |

OTHER PUBLICATIONS

Automatic Detection and Classification of Pole-Like Objects in Urban Point Cloud Data Using an Anomaly Detection Algorithm (Year: 2015).

(Continued)

*Primary Examiner* — Nizar N Sivji
(74) *Attorney, Agent, or Firm* — Lempia Summerfield Katz LLC

(57) ABSTRACT

Embodiments include apparatus and methods for automatic detection of pole-like objects for a location at a region of a roadway and automatic localization based on the detected pole-like objects. Pole-like objects are modeled as cylinders and the models are generated based on detected vertical clusters of point cloud data associated to corresponding regions along the region of the roadway. The modeled pole-like objects are stored in a database and associated with the region of the roadway. Sensor data from a user located at the region of the roadway is received. The pole-like object model is accessed and compared to the received sensor data. Based on the comparison, localization of the user located at the region of the roadway is performed.

20 Claims, 15 Drawing Sheets

(51) Int. Cl.
  *G06K 9/62* (2022.01)
  *G06V 10/44* (2022.01)
  *G06V 20/56* (2022.01)
  *G06V 10/75* (2022.01)
(52) U.S. Cl.
  CPC ............ *G06V 10/457* (2022.01); *G06V 20/56* (2022.01); *G06T 2207/10028* (2013.01); *G06T 2207/30252* (2013.01); *G06V 10/759* (2022.01)
(58) Field of Classification Search
  CPC .............. G06K 2009/6213; G06T 7/75; G06T 2207/10028; G06T 2207/30252
  See application file for complete search history.

(56) References Cited

U.S. PATENT DOCUMENTS

| | | | | |
|---|---|---|---|---|
| 2010/0207936 | A1* | 8/2010 | Minear | G06T 7/30 345/419 |
| 2011/0279452 | A1* | 11/2011 | Ibe | G01C 21/3638 345/419 |
| 2013/0169685 | A1* | 7/2013 | Lynch | G06T 7/521 345/634 |
| 2016/0249040 | A1 | 8/2016 | Mesher | |
| 2018/0203124 | A1 | 7/2018 | Izzat | |
| 2018/0232583 | A1 | 8/2018 | Wang | |
| 2020/0017318 | A1 | 1/2020 | Mannari | |
| 2020/0074212 | A1 | 3/2020 | Amano | |

OTHER PUBLICATIONS

Cabo, C., et al. "An Algorithm for Automatic Detection of Pole-Like Street Furniture Objects from Mobile Laser Scanner Point Clouds." ISPRS Journal of Photogrammetry and Remote Sensing vol. 87. Jan. 1, 2014. (pp. 1-11).
El-Halawany, Sherif Ibrahim, and Derek D. Lichti. "Detection of road poles from mobile terrestrial laser scanner point cloud." Multi-Platform/Multi-Sensor Remote Sensing and Mapping (M2RSM), 2011 International Workshop on. IEEE, 2011.
European Search Report for European Patent Application No. 19218934.8-1001 dated Jun. 2, 2020.
Golovinskiy, Aleksey, Vladimir G. Kim, and Thomas Funkhouser. "Shape-based recognition of 3D point clouds in urban environments." Computer Vision, 2009 IEEE 12th International Conference on. IEEE, 2009.
Hao, Wen, et al. "Hierarchical extraction of pole-like objects from scene point clouds." Optical Engineering 57.8 (2018): 083106.
Huang, Jing, and Suya You. "Pole-like object detection and classification from urban point clouds." Robotics and Automation (ICRA), 2015 IEEE International Conference on. IEEE, 2015.
Landa, Jaromír, and Vít Ondroušek. "Detection of Pole-like Objects from LIDAR Data." Procedia—Social and Behavioral Sciences, vol. 220, 2016, pp. 226-235., doi:10.1016/j.sbspro.2016.05.494.
Lehtomäki, Matti, et al. "Detection of vertical pole-like objects in a road environment using vehicle-based laser scanning data." Remote Sensing 2.3 (2010): 641-664.
Li, F., et al. "Pole-Like Road Furniture Detection in Sparse and Unevenly Distributed Mobile Laser Scanning Data." ISPRS Annals of Photogrammetry, Remote Sensing & Spatial Information Sciences 4.2 (2018).
Li, Zhuqiang, et al. "Classification of urban point clouds: A robust supervised approach with automatically generating training data." IEEE Journal of Selected Topics in Applied Earth Observations and Remote Sensing 10.3 (2017): 1207-1220.
Modeling the influence of task on attention (Year: 2004).
Ordóñez, Celestino, Carlos Cabo, and Enoc Sanz-Ablanedo. "Automatic Detection and Classification of Pole-Like Objects for Urban Cartography Using Mobile Laser Scanning Data." Sensors 17.7 (2017): 1465.
Tombari, Federico, et al. "Automatic detection of pole-like structures in 3d urban environments." Intelligent Robots and Systems (IROS 2014), 2014 IEEE/RSJ International Conference on. IEEE, 2014.
Automatic Recognition of Pole-Like Objects from Mobile Laser Scanning Point Clouds (Year: 2018).

* cited by examiner

AUTOMATIC DETECTION AND POSITIONING OF POLE-LIKE OBJECTS IN 3D

CROSS-REFERENCE TO RELATED APPLICATIONS

This application is a continuation under 35 U.S.C § 120 and 37 C.F.R. § 1.53(b) of U.S. patent application Ser. No. 16/227,722 filed Dec. 20, 2018, the entire disclosure of which is hereby incorporated by reference.

FIELD

The following disclosure relates to the detection of vertical clusters of point cloud data associated with a vicinity of a roadway that represent pole-like objects at the vicinity of the roadway, and in addition, applications for localization at the vicinity of the roadway based on the detected pole-like objects.

BACKGROUND

The Global Positioning System (GPS) or another global navigation satellite system (GNSS) provides location information to a receiving device anywhere on Earth as long as the device has a substantial line of sight without significant obstruction to three or four satellites of the system. The GPS system is maintained and made available by the United States government. Originally, the government retained exclusive use of GPS. Over time increasing levels of accuracy of the GPS signals were made available to the public.

Accuracy of the GPS system alone is about 50 feet or 15 meters. The accuracy may be augmented using secondary techniques or systems such as the Wide Area Augmentation System (WAAS), Differential GPS (DGPS), inertial navigation systems (INS) and Assisted GPS. WAAS and DGPS improve accuracy using ground stations that transmit position information. INS utilizes internal sensors at the receiving device for improving the accuracy of GPS.

However, some applications require greater accuracies than obtainable with GPS, even with enhanced accuracy techniques. For example, in HD mapping and navigating applications, the receiving device may be placed on a map in a three-dimensional view with greater accuracy than that obtainable from GPS techniques. Localization techniques that match a location to a map or environment face additional challenges in improving this accuracy.

Modern vehicles require accurate navigational systems. A vehicle may eliminate many dangerous unknowns by identifying exactly where the vehicle is on the road in real time, along with its immediate surroundings (i.e., localization). A high definition (HD) map may be a crucial component of assisted or automatic driving technology. Vehicles may include many sensors, but an HD map may be the most important tool vehicles use.

Sensors in vehicles may be able to detect lanes and lane markings in real time using image processing and light detection and ranging (LiDAR) based systems. These systems are useful for obstacle avoidance and detecting the movements of other vehicles. When used alone though, on-board sensor systems may exhibit large blind spots and may be unable to predict events or maneuvers even a short distance away.

On-board sensors, however, when combined with HD maps may allow for assisted and highly automated vehicle operation. HD maps may allow a vehicle to identify precisely where it is with respect to the road (or the world) far beyond what the GPS can do, and without inherent GPS errors. The HD map allows the vehicle to plan precisely where the vehicle may go, and to accurately execute the plan because the vehicle is following the map. By identifying precisely where a vehicle is on the road to the decimeter or even centimeter, and understanding the surroundings, a mapping platform may bring advanced safety to an ever-changing environment.

To take advantage of HD maps for localization techniques, vehicles must sense their environment and match what they see to an HD map. Localization relies on pertinent structures in the world being present in these HD maps. There is a need for better mapping for connected cars, with more exact localization positioning technology and cloud connectivity that will help provide an even safer drive.

SUMMARY

In one embodiment, a method is provided for automatically detecting pole-like objects for a location along a region of a roadway, the method including receiving, by a processor, point cloud data associated with the location along the region of a roadway, identifying, by the processor, horizontal slices of point cloud data based on a predetermined horizontal slice thickness or a predetermined resolution, generating, by the processor, two-dimensional (2D) occupancy images for the horizontal slices of point cloud data, wherein a 2D occupancy image for a horizontal slice of point cloud data represents a finite height of point cloud data, detecting, by the processor, vertical clusters of point cloud data based on the 2D occupancy images, determining, by the processor, whether the vertical clusters of point cloud data represent pole-like objects, and modeling, by the processor, the vertical clusters of point cloud data as cylinders.

In another embodiment, an apparatus is provided for detecting pole-like objects for a location along a region of a roadway. The apparatus includes a communication interface, a point cloud analyzer, an object classifier, and an object modeler. The communication interface is configured to receive point cloud data associated with the location along the region of the roadway. The point cloud analyzer is configured to identify horizontal slices of point cloud data based on a predetermined horizontal slice thickness or a predetermined resolution, generate 2D occupancy images for the horizontal slices of point cloud data, where a 2D occupancy image for a horizontal slice of point cloud data represents a finite height of point cloud data, and detect vertical clusters of point cloud data based on the 2D occupancy images. The object classifier is configured to determine whether the vertical clusters of point cloud data represent pole-like objects. The object modeler is configured to model the vertical clusters of point cloud data as cylinders.

In another embodiment, a non-transitory computer-readable medium includes instructs for a processor to perform identifying a location of a user at a region of a roadway, accessing modeled features associated with the region of the roadway, where the modeled features represent pole-like objects at the region of the roadway, and where the modeled features are generated based on detected vertical clusters of point cloud data associated to corresponding regions along the region of the roadway, receiving sensor data from the user located at the region of the roadway, comparing the modeled features and the received sensor data, and performing localization of the user located at the region of the roadway based on the comparison.

BRIEF DESCRIPTION OF THE DRAWINGS

Exemplary embodiments of the present invention are described herein with reference to the following drawings.

DETAILED DESCRIPTION

Figure 1:
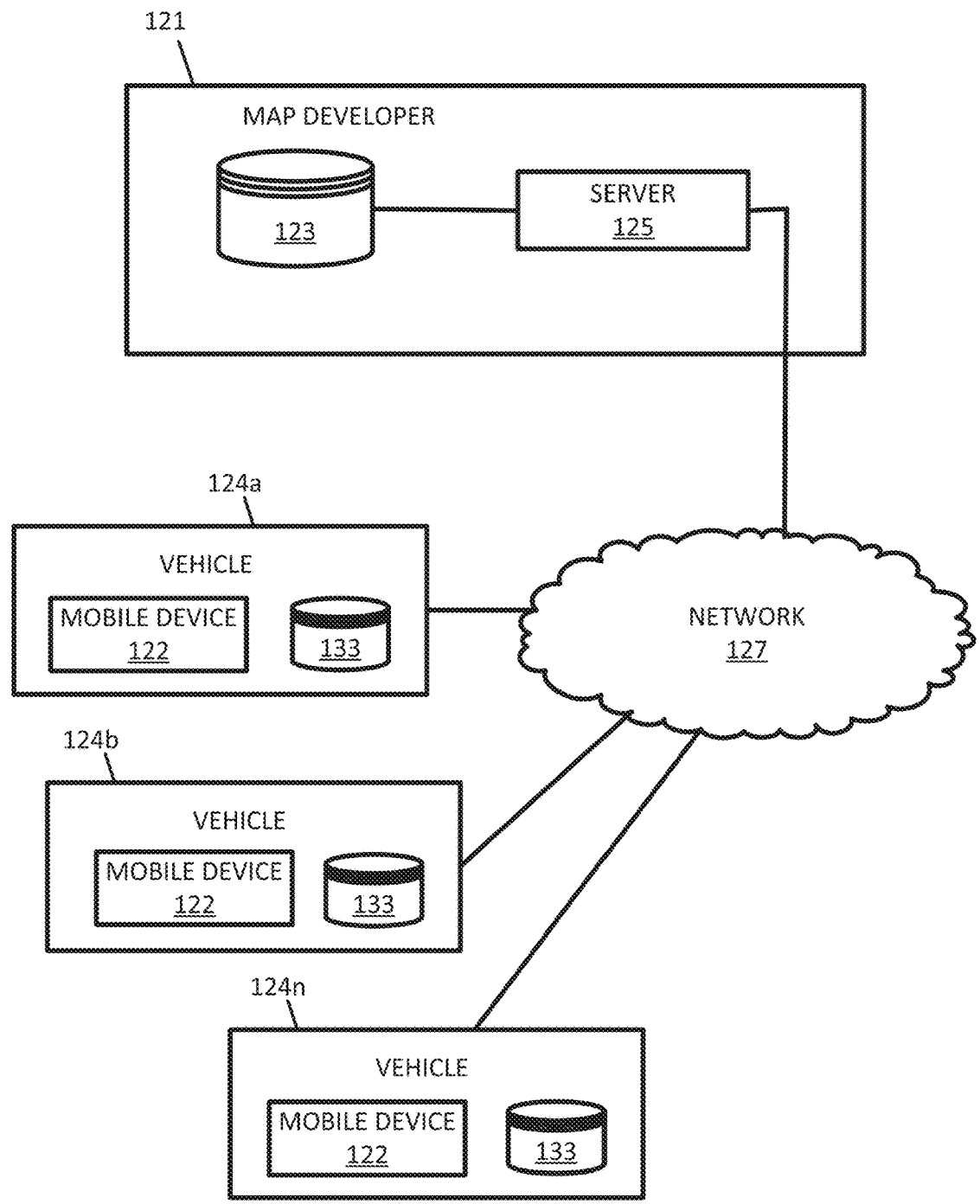
FIG. 1 illustrates an example system for detecting pole-like objects for a location along a region of a roadway.

Example applications that utilize location data and benefit from increases in positional accuracy include localization applications, navigational applications, three-dimensional (3D) applications, obstacle avoidance applications, mapping applications, and building modeling applications. Localization applications may include a category of applications that match a set of observed data collected at a location to a known model of the surroundings. For example, the surroundings at any point may provide a signature of the location. Three-dimensional applications may include any application that provides a 3D model and places a location with that model. Example 3D applications include augmented reality, 3D navigation, and 3D mapping. Building modeling applications may include models of buildings, indoor environments, or architecture that are matched with a detected location. Obstacle avoidance and other mapping applications may also utilize observed data collected at a location in order to get a better understanding of the surroundings.

One example of a localization application is autonomous vehicle technology, where autonomous driving relies on object detection. To take advantage of high definition (HD) maps, autonomous vehicles may sense the environment and match detected objects or features to a map using a localization process. The localization process relies on pertinent structures in the world being present in the map. Pole-like objects, or cylindrically-shaped, vertically aligned objects having a main axis extending in a vertical direction (i.e, the z-direction in a three-dimensional Cartesian coordinate system), such as light poles, sign posts, telephone poles, mile markers, tree trunks, etc., are one such well-defined object that can be used for localization. Additionally, pole-like objects support other road-signage and traffic lights, thus they can potentially be used as priors for finding other features. Pole-like objects that are separated from their surroundings may be easier to detect. For localization applications, two-dimensional (2D) or three-dimensional (3D) occupancy grids and/or 2D occupancy images may be generated for locations along a region of a roadway. Two-dimensional occupancy grids and/or 2D occupancy images may be more relevant for certain applications, since many environment models in vehicles utilize 2D technology, such as radar and ultrasonic sensors. Two-dimensional occupancy grids and/or 2D occupancy images require less memory and are faster to load, making the localization process faster and more efficient with 2D occupancy grids and/or 2D occupancy images versus 3D occupancy grids and/or 3D occupancy images.

Existing pole-like object detection methods may rely on point cloud data which is dense enough to compute neighborhood statistics for individual points. However, due to the scanning pattern of current 3D sensors, distant objects produce more sparse point cloud data readings compared to closer objects. In autonomous vehicle applications, the point cloud data from roadside objects are so sparse that it is often not possible to compute reliable statistics for each point of the point cloud data. The proposed solution deals with this problem by approximating represented 3D volumes with discrete 3D grids. Each grid cell of a 3D occupancy grid is marked as either "occupied" or "unoccupied" based on whether sensor data is received for the area of the location represented by the respective grid cells. The structure of the scene for the region along the roadway may be fully encoded based on the occupancy information. Each layer (or slice) of this 3D grid is represented as a 2D occupancy image which enables more efficient implementation of processing algorithms.

Existing pole-like object detection techniques compute the likelihood of the 3D data points representing pole-like objects using neighborhood statistics of sample points. Using dense point cloud data, existing methods process individual points and try to decide whether the individual points are part of a vertical structure. The technical problem of existing techniques is that when the point cloud data is sparse, there are not enough data points for the existing techniques to accurately compute certain point features and detect the presence of pole-like objects. This may result in incorrectly excluding points from further processing in certain sparse areas, even though the area may contain pertinent structures, such as pole-like objects, along the roadway that would be useful for the various applications mentioned above. To resolve this technical problem, the proposed solution uses sparse point clusters and attempts to connect separated components into a single vertical entity, and then decides whether the single vertical entity is a vertical structure. The proposed solution involves a three-step approach. The first step is determining the locations of clusters of point cloud data that could potentially constitute a pole-like object. Because of the sparse and un-organized nature of LiDAR data, there are many such pole-like object candidates. The determined vertical clusters of point cloud data may be isolated from their environment, making them easier to detect. The second step uses a classifier to determine if each pole-like object candidate is indeed a pole-like object or not based on statistics of the data points of which it is composed. For example, the proposed solution may calculate "features" that describe the shape and orientation of the vertical clusters in the 3D space. These features may be fed into a machine learning algorithm to determine whether they are pole-like objects or not. The third aspect robustly models these pole-like objects as cylinders and determines their actual height and cross-section size. For example, for those vertical clusters that are determined to be pole-like objects, the proposed solution may apply a robust cylinder fitting algorithm to determine cylinder attributes. More specifically, the technical solution of the proposed solution involves identifying horizontal slices of point cloud data based on a predetermined slice thickness or predetermined resolution, generating 2D occupancy grids and images for the horizontal slices, and then detecting vertical clusters of 3D data points by comparing the 2D occupancy images at each horizontal slice for regions of occupied grid cells. Then, it may be determined whether the vertical clusters of point cloud data represent pole-like objects. Filtering the data points using the above-mentioned classification method reduces the amount of data points being processed, which increases efficiency and speed of the processing and requires less storage and bandwidth to operate the applications mentioned above.

Another improvement made available by the proposed solution is the process by which the vertical clusters are determined to represent pole-like objects. The proposed solution makes this determination by employing machine learning methods (i.e., in a detector) based on statistics of the data points that make up the vertical clusters in conjunction with annotators that label or classify the point clusters of pole-like object candidates as either representing a pole-like object or not representing a pole-like object. The annotators may also inspect the detections from an earlier version of the detector, remove false-positives (i.e., spurious detections) and add false-negatives (i.e., missed detections), which improves upon the accuracy of the next version of the detector by retraining the machine learning model. The annotators may be human annotators. This type of classification of vertical clusters as pole-like objects allows positive examples of pole-like objects to be labelled as such by annotators. Thus, the proposed solution provides a method in which large amounts of training data is generated, which results in more accurate detection of pole-like objects that may be used for the applications discussed above. There is a need to continue to enable localization along all portions of a roadway, even though collected 3D data points along the region of the roadway may be sparse. The following embodiments provide improved techniques for providing more accurate detection of pole-like objects along an entire region of a roadway and create a simpler and more efficient map building system. Improved maps allow autonomous vehicles to move safely and reliably in ever-changing environments, providing precise and constantly updated information about their surroundings.

The following embodiments provide improvements for positional accuracy and identifying objects, or obstacles, within 2D occupancy grids by generating 2D occupancy images representing data points within a finite height or altitude range and detecting vertical clusters of data points by comparing regions of occupied grid cells between adjacent 2D occupancy images. A 2D occupancy grid is a grid representing a 3D space. The 2D occupancy grid includes a plurality of grid cells that each represents a portion of the 3D space. In one example, the grid cells include the positional location of the grid cell and data indicative of whether the portion of the 3D space represented by the grid cell contains data for an object at that particular portion of the 3D space. Grid cells that contain data indicative of an object at the 3D space represented by that grid cell may be referred to as an "occupied grid cell." Likewise, a grid cell containing no data for an object at the 3D space represented by that grid cell may be referred to as an "unoccupied grid cell." In another example, the grid cell data includes the position within the grid cell for objects within the grid cell. Alternatively, the grid cells may not be encoded with relative position in the grid. The grid cells may be ordered in a logical sequence in which the sequence conveys the relative position in the grid.

Data indicative of an object at a particular 3D space may be considered point cloud data. A point cloud is a set of data points in space generally produced by 3D scanners. Point cloud data may be gathered from an aerial LiDAR system, such as laser scanners. The LiDAR, or point cloud, data may include latitude, longitude, and altitude values. The point cloud data assigned to corresponding grid cells in a 2D occupancy grid may be limited depending on the methods used for collecting the point cloud data. The process of assigning point cloud data to corresponding grid cells is dependent on various thresholds, such a predetermined altitude range, as well as the grid cell size used to produce the point cloud data. Determining the occupancy of a particular grid cell based on the point cloud data assigned to that particular grid cell may also be limited by a predetermined threshold number of point cloud data points. For example, a grid cell may be identified as occupied when the number of point cloud data points assigned to that grid cell is above the predetermined threshold value. Likewise, a grid cell may be identified as unoccupied when the number of point cloud data points assigned to that grid cell is below the predetermined threshold value.

The following embodiments reduce the amount of computing and networking resources required to detect and represent roadside objects of the 3D space, such as pole-like objects, and communicate modeled features of the space for applications such as localization. Voxels for a 3D space containing large amounts of point cloud data points require a vast amount of storage space and bandwidth in order to be processed and communicated in a mobile system. The following embodiments utilize 2D grid cells arranged in a 2D occupancy grid for limited amounts of point cloud data. Thus, detecting pole-like objects in the 3D space and modeling these objects as cylinder features to represent roadside objects greatly reduces the storage and/or bandwidth requirements, since this representation keeps most of the relevant information useful for localization while massively reducing the data size as compared to modeled features based on voxels of a 3D occupancy grid containing large amount of data points. The disclosed embodiments may also lead to an improvement in the computational system, e.g. in the way that roadway feature data is validated using a decentralized mechanism. The increased efficiency and usage of resources may lead to less downtime, quicker implementation time, fewer errors, and as such, more efficient use of navigation services. The quicker implementation time and fewer errors may lead to more accurate up to date map data for navigation services.

The following embodiments may relate to several technological fields including, but not limited to, positioning technologies in navigation, vehicle positioning, object detection, obstacle avoidance, and other location-based systems. The following embodiments achieve advantages in each of these technologies as positioning techniques are made more accurate as well as consistent over a geographic area. Improved positioning improves navigation because vehicles, for example, may be routed more precisely from an origin to the destination. Vehicle positioning technology is improved by the improved positioning technology because vehicles can be controlled accurately even when GPS positioning is not fully available or sufficiently accurate. In addition, users of navigation, vehicle positioning, object detection, obstacle avoidance, and other location-based systems are more willing to adopt these technological advances in positioning.

FIG. 1 illustrates an example system for automatically detecting pole-like objects. In FIG. 1, one or more vehicles 124a, 124b, . . . 124n are connected to the server 125 though the network 127. The vehicles 124a-n may be directly connected to the server 125 or through an associated mobile device 122. A map developer system 121, including the server 125 and a geographic database 123, exchanges (e.g., receives and sends) data from the vehicles 124a-n. The mobile devices 122 include databases 133 corresponding to a local map, which may be modified according to the server 125. The mobile device 122 may be standalone device such as smartphones or devices integrated with vehicles. Additional, different, or fewer components may be included.

One of the vehicles 124 may be a collection vehicle, which is discussed in more detail below with respect to FIG. 7. The collection vehicle may include one or more distance data collection device or sensor, such as LiDAR device. The distance data collection sensor may generate point cloud data. The distance data collection sensor may include a laser range finder that rotates a mirror directing a laser to the surroundings or vicinity of the collection vehicle on a roadway or another collection device on any type of pathway. Other types of pathways may be substituted for the roadway in any embodiment described herein.

The mobile device 122 and/or the server 125 receives point cloud data collected by a distance sensor and describing the vicinity of the region of the roadway. The point cloud is formed of points or pixels, each of which may include an intensity and location data. The location data may be a three component coordinate (e.g., [x, y, z]) or a direction and a distance. The direction may be defined as a first angle from a two reference planes (e.g., [alpha, beta, distance]), or as a direction of travel. The reference planes may be a horizontal plane parallel to the surface of the Earth and a vertical plane perpendicular to the surface of the Earth.

The mobile device 122 and/or the server 125 identifies horizontal slices of point cloud data based on a predetermined horizontal slice thickness or a predetermined resolution. To identify horizontal slices of point cloud data, the mobile device 122 and/or the server 125 may associate the point cloud data to respective horizontal slices based on the predetermined horizontal slice thickness or predetermined resolution. The mobile device 122 and/or the server 125 may estimate point cloud data associated with a road surface at the location of the region of the roadway. The horizontal slice associated with the road surface may be the horizontal slice having the most data points of point cloud data. The mobile device 122 and/or the server 125 may then exclude the point cloud data estimated to be associated with the road surface from the horizontal slices of point cloud data. For example, the mobile device 122 and/or the server 125 may filter out or remove the horizontal slice of data points from the point cloud corresponding to the roadway. The road surface may be defined as the area between the edges of the roadway. The remaining horizontal slices of point cloud data represents the environment at the region of the roadway. The point cloud data may be filtered according to other parameters. The point cloud data may also be reduced by a threshold distance in each dimension. The mobile device 122 and/or the server 125 may assign the point cloud data associated with respective horizontal slices to corresponding grid cells within the respective horizontal slices. For example, the horizontal slices may be discretized into predetermined grid cells. Examples of horizontal slices of point cloud data points based on a predetermined horizontal slice thickness or a predetermined resolution are described in more detail below in reference to FIG. 2.

The mobile device 122 and/or the server 125 may generate two-dimensional (2D) occupancy images for the horizontal slices of point cloud data. A 2D occupancy image for a horizontal slice of point cloud data may represent a finite height of point cloud data. To generate the 2D occupancy images, the mobile device 122 and/or the server 125 may assign the point cloud data in respective horizontal slices of point cloud data to corresponding grid cells. The mobile device 122 and/or the server 125 may then determine a grid cell occupancy for the grid cells. The mobile device 122 and/or the server 125 may determine occupancy based on a predetermined threshold number of point cloud data points assigned to corresponding grid cells. The mobile device 122 and/or the server 125 determines which grid cells are occupied. As discussed above, an "occupied" grid cell is a grid cell that contains data indicative of an object at the 3D space represented by that grid cell. Similarly, an "unoccupied" grid cell is a grid cell containing no data for an object at the 3D space represented by that grid cell. The grid cell occupancy may be a binary indication (e.g., 1 or 0, on or off) that the grid cell has been included to represent an object at the 3D space. For example, an indication of 1 or on may indicate that the grid cell is occupied, and an indication of 0 or off may indicate that the grid cell is unoccupied. This indication may also be reversed, where 1 and on indicate unoccupied and where 0 and off indicate occupied. Other two value binary indicators now known or later developed are possible.

To determine grid cell occupancy, the mobile device 122 and/or the server 125 may first determine a number of point cloud data points assigned to a corresponding grid cell. The mobile device 122 and/or the server 125 may then determine whether the corresponding grid cell is occupied or unoccupied based on a predetermined threshold number of point cloud data points. For example, a grid cell may be determined to be occupied when the number of point cloud data points assigned to the corresponding grid cell is above the predetermined threshold. Similarly, the grid cell may be determined to be unoccupied when the number of point cloud data points assigned to the corresponding grid cell is below the predetermined threshold. The predetermined threshold number of point cloud data points may be, for example, 5 data points. Other predetermined numbers of data points may be used (e.g., 3, 10, 25, 50, 100, or another number). Point cloud data points not meeting the predetermined threshold are not utilized by the mobile device 122 and/or the server 125 in the system for detecting pole-like objects, such as the system of FIG. 1. Discarding, or ignoring, portions of point cloud data points does not take into account the dimensions of the grid (e.g., whether the grid is 2×3 or 1×19). All point cloud data points that do not meet this threshold are discarded. An example of determining grid cell occupancy is described in more detail below in reference to FIGS. 3 and 4.

After assigning point cloud data and determining grid cell occupancy, the mobile device 122 and/or the server 125 may generate a 2D occupancy grid based on the grid cell occupancy. As described above, a 2D occupancy grid is a grid representing a 3D space. The 2D occupancy grid includes a plurality of grid cells that each represents a portion of the 3D space. A 2D occupancy grid may include one or more rows, as shown below in FIG. 3. The 2D occupancy grid may act as a signature for the location along the region of the roadway. This signature may be used by vehicle applications, such as assisted driving or navigation applications. Examples of assisted driving applications include autonomous vehicles, highly assisted vehicles, or advanced driving assistance systems. For example, localization applications may use the 2D occupancy grid acting as a signature in order to identify exactly where the vehicle is on the road in real time, along with its immediate surroundings.

The mobile device 122 and/or the server 125 may encode the 2D occupancy grid as a 2D binary occupancy image. This is described in more detail below in reference to FIG. 4. The mobile device 122 and/or the server 125 may store the 2D binary occupancy image in a database 123 or 133. The mobile device 122 and/or the server 125 may filter individual grid cells as "noise," such that image cells with too little points are eliminated. This may be performed automatically for every horizontal slice of point cloud data. This ensures that the retained grid cells contain relevant information and correspond to pole-like objects useful for localization. The remaining occupancy image represents where in the 3D space point cloud data exists. The 3D space represented by the occupancy image may be small, for example 0.2 m×0.2 m×0.2 m. Filtering grid cells as noise, based on their similarity to other grid cells in adjacent rows of grid cells, reduces the amount of computing and networking resources required to represent roadside objects, such as pole-like objects, of the 3D space and improves the ability to communicate features of the space using the 2D occupancy image more efficiently. One example of filtering includes thresholding the grid cell values against learned parameters in a decision tree. This technique of filtering involves machine learning and may utilize neural networks.

The mobile device 122 and/or the server 125 may detect vertical clusters of point cloud data based on the 2D occupancy images. To detect vertical clusters of point cloud data, the mobile device 122 and/or the server 125 may determine occupied and unoccupied regions of the 2D occupancy images based on a connected-component analysis. An occupied region may be a grid cell or group of grid cells containing point cloud data indicative of an object at the grid cell or group of grid cells. The mobile device 122 and/or the server 125 may then compare the occupied regions of adjacent 2D occupancy images and identify groups of similar occupied regions arranged vertically as vertical clusters of point cloud data based on the comparison and predetermined parameters. An example of detecting vertical clusters of point cloud data is described in more detail below in reference to FIGS. 4 and 5. An example of the effect that a resolution parameter has on detecting vertical clusters of point cloud data is described in more detail below in reference to FIG. 6.

The mobile device 122 and/or the server 125 may determine whether the vertical clusters of point cloud data represent pole-like objects. To do this, the mobile device 122 and/or the server 125 may calculate features that represent the vertical clusters shape, orientation, size, and point density and then input the features into a detector, such as a pre-trained machine learning algorithm, to determine whether the vertical clusters of point cloud data represent pole-like objects. The detector or pre-trained machine learning algorithm may be a Support Vector Machine and may be pre-trained using annotators and a detection algorithm, where the annotators remove false-positives and add false-negatives of candidates of potential pole-like objects generated based on a sample number of vertical clusters of point cloud data. As mentioned above, the annotators may be human annotators that work together with the detection algorithm. Training the machine learning algorithm may be an iterative process performed until a threshold percentage of pole-like objects at the location along the region of the roadway are determined. For example, the detector may be first trained on a small number of samples and then run to detect and generate pole-like objects. Human annotators may then correct these pole-like object candidates by removing false-positives (i.e., spurious detections) and adding false-negatives (i.e., missed detections). These new clusters may then be used train a new classifier and the detector may be run again, this time on a new and larger data set. In a repeated process such as this, the detector can be both trained and used to generate more training data, while reducing the overhead of using expensive manual operations. This method of boot-strapping the training using annotators improves the speed and efficiency of the process as well as improving the accuracy of the results. This iterative process may be repeated until at least 80% of pole-like objects are detected. However, the threshold percentage may be any percentage.

Once vertical clusters of point cloud data are detected and determined to represent pole-like objects, the mobile device 122 and/or the server 125 may model the vertical clusters of point cloud data as cylinders. The modeling of the vertical clusters may be performed in a purely automated fashion. To model the vertical clusters as cylinders, the mobile device 122 and/or the server 125 may apply a cylinder fitting algorithm to the vertical clusters of point cloud data and determine cylinder attributes based on the cylinder fitting algorithm. The cylinder attributes may refer to the size, angle, and position of the cylinders. The cylinder fitting algorithm may be a Random Sample Consensus (RANSAC) algorithm. The cylinder fitting algorithm may search for an optimum cylinder by considering predetermined size and positioning constraints, such as size, position, and angle requirements for a given project. For instance, the mobile device 122 and/or the server 125 may determine the bottom most point of the cylinder, the height of the cylinder, the radius of the cylinder, the angle of the cylinder with respect to the ground, and the global coordinates of the cylinder. Once the vertical clusters are modeled, the mobile device 122 and/or the server 125 may compare the dimensions of the modeled cylinder and angle of the modeled cylinder with respect to the ground with predetermined threshold dimensions and angles in order to determine whether the modeled cylinders comply with the predetermined thresholds. For instance, the mobile device 122 and/or the server 125 may only accept pole-like objects modeled as cylinders having certain predetermined threshold sizes, including height and radius, and predetermined angles with respect to the ground. These predetermined threshold sizes and angles may be based on certain project specifications and may be regulated by governmental rules, laws, or regulations, such as those administered by various departments of transportation. If the mobile device 122 and/or the server 125 determine that the modeled cylinders do not comply with the predetermined thresholds, those modeled cylinders may be discarded and/or ignored. The modeled cylinders that comply with the predetermined thresholds, including the cylinder attributes, may be saved in a database 123 and/or 133. An example of a vertical cluster modeled as a cylinder is described in more detail below in reference to FIG. 7.

The mobile device 122 and/or the server 125 may provide the generated 2D occupancy grids, the 2D occupancy images, and/or the modeled cylinders to content providers, such as a map developer 121 or an applications developer, to include the 2D occupancy grids, the 2D occupancy images, and/or the modeled cylinders in detailed maps of locations or applications, such as mobile applications, using location related information. The 2D occupancy grids, the 2D occupancy images, and/or the modeled cylinders may also be provided to end users, such as other mobile devices 122 or vehicles 124, in order to perform localization techniques. The 2D occupancy grids, the 2D occupancy images, and/or the modeled cylinders may be provided to other various services or providers as well, such as navigational services or traffic server providers. The 2D occupancy grids, the 2D occupancy images, and/or the modeled cylinders may also be provided for non-localization functions, such as being provided to highway engineers to identify areas not containing any roadside objects. As discussed above, the 2D occupancy grids and/or 2D occupancy images may be provided in a binary file format.

Figure 2:
FIG. 2 illustrates an example set of horizontal slices of point cloud data at a region of a roadway.

FIG. 2 illustrates an example set of horizontal slices 132 of point cloud data 140 at a region of a roadway 131. After receiving point cloud data 140 associated with the location along the region of a roadway 131, the mobile device 122 and/or the server 125 identifies horizontal slices 132 of point cloud data 140 based on a predetermined horizontal slice thickness 134 or a predetermined resolution. FIG. 2 shows three horizontal slices 132a-c, although any number of horizontal slices 132 may be identified. The number and size of horizontal slices 132 identified may depend on the received point cloud data 140 associated with the location along the region of a roadway 131. The predetermined horizontal slice thickness 134 or a predetermined resolution may be predetermined based on a number of parameters. The parameters may be defined by content providers, such as application developers or map developers, end users, navigational services or traffic server providers. The thickness 134 and resolution of the horizontal slices 132a-c may be the same. However, the thickness 134 and resolution of the horizontal slices 132a-c may also be different, or adaptive. For optimization purposes, it may be advantageous for vehicle applications to use horizontal slices 132 of the same thickness 134 and resolution as opposed to adaptive thickness and resolution, since adaptive thickness and resolution of horizontal slices 132 may require an increased amount of computing and/or networking resources required to load and utilize the horizontal slices 132.

The horizontal slices 132 may be identified by first associating the point cloud data 140 to respective horizontal slices 132 of point cloud data 140 based on the predetermined horizontal slice thickness 134 or predetermined resolution. Then, the point cloud data 140 associated with a road surface at the location along the region of the roadway 131 may be estimated and the horizontal slice 132 containing point cloud data 140 associated with the road surface 131 may be excluded. The horizontal slice 132 containing the most data points may be the horizontal slice 132 associated with the roadway surface. Excluding this horizontal slice 132 leaves only those horizontal slices 132 associated with roadside objects, including pole-like objects, at the region of the roadway, which is most important for the applications discussed above.

As shown in FIG. 2, the thickness 134 of horizontal slices 132a-c are the same. However, as discussed above, the thickness of horizontal slices 132a-c be different. Also as shown in FIG. 2, the horizontal slices 132 predominately cover only one side of the roadway 131. However, for vehicle applications, such as localization techniques, it is advantageous to have complete coverage for a region of roadway of interest 131. Therefore, it is advantageous for the horizontal slices 132 to cover both sides of the region of the roadway 131 to ensure that all roadside objects, such as pole-like objects, useful for localization are detected. Not having horizontal slices 132 that cover both sides of the region of the roadway 131 may result in missing data associated with the region of the roadway 131, which in turn may have negative consequences for vehicle applications and result in unsafe operation of vehicles, particularly with assisted driving applications. The mobile device 122 and/or the server 125 may calculate a minimum number of horizontal slices 132 needed to capture the roadside objects, such as pole-like objects, useful for localization at the region of the roadway 131. This calculation may be based on the predetermined thickness 134 of the horizontal slices 132 and the point cloud data 140 received for the region of the roadway 131.

Figure 3:
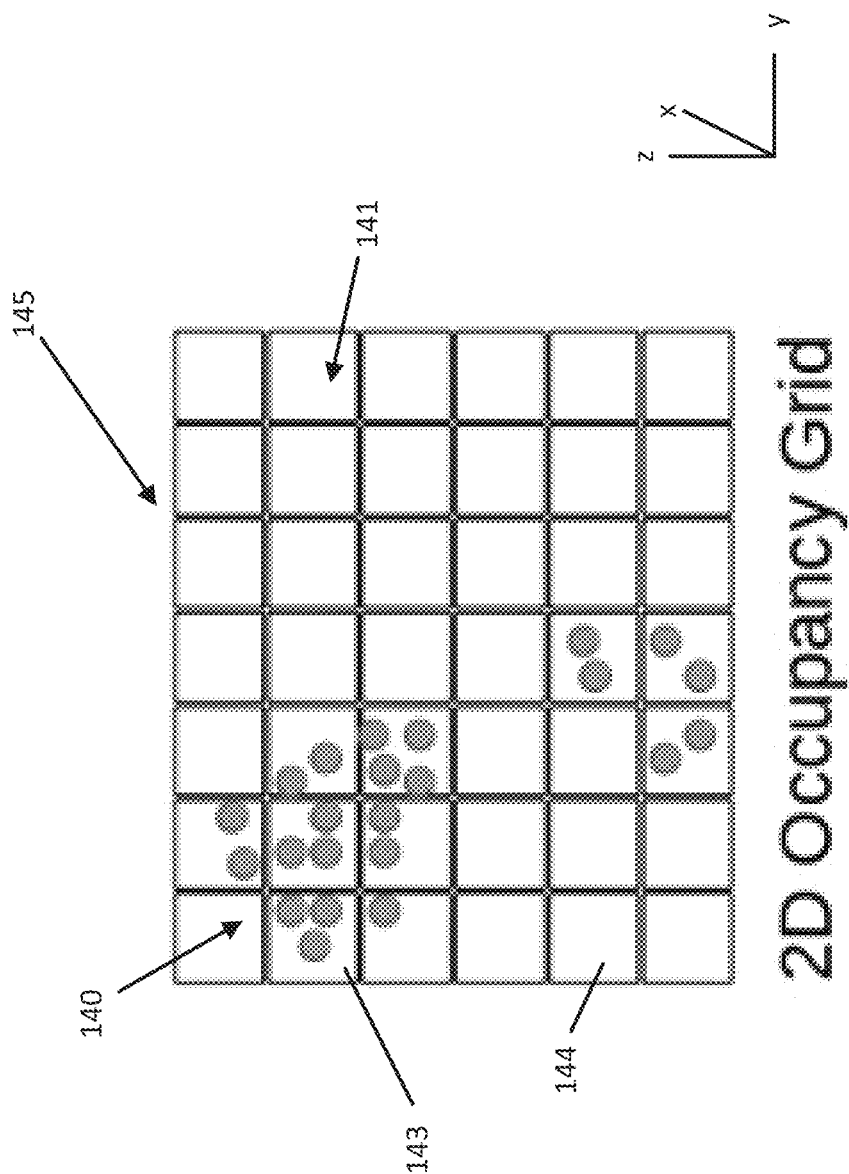
FIG. 3 illustrates an example 2D occupancy grid representing point cloud data assigned to corresponding grid cells.

FIG. 3 illustrates an example 2D occupancy grid 145 representing point cloud data 140 assigned to corresponding grid cells 141 of a horizontal slice 132 of FIG. 2. The 2D occupancy grid 145 includes a plurality of grid cells 141 representing a three-dimensional space. Each grid cell 141 of the plurality of grid cells 141 represents a portion of the three-dimensional space and includes data indicative of a grid cell occupancy 143, 144. The grid cell occupancy 143, 144 indicates whether the portion of the three-dimensional space represented by the grid cell 141 contains data for an object at the portion of the three-dimensional space. As discussed above, the mobile device 122 and/or the server 125 receives point cloud data 140 for the region of the roadway 131 and then assigns the point cloud data 140 in respective horizontal slices 132 of point cloud data 140 to corresponding grid cells 141.

The mobile device 122 and/or the server 125 determines a grid cell occupancy 143, 144 for the grid cells 141. The grid cell occupancy may be based on a predetermined threshold of point cloud data 140 assigned to corresponding grid cells 141. To determine the grid cell occupancy 143, 144, the mobile device 122 and/or the server 125 determines a number of point cloud data points 140 assigned to a corresponding grid cell 141 and then determines whether the corresponding grid cell 141 is occupied 143 or unoccupied 144. For example, when the number of point cloud data points 140 assigned to the corresponding grid cell 141 is above a predetermined threshold, the grid cell 141 is occupied 143. Likewise, when the number of point cloud data points 140 assigned to the corresponding grid cell 141 is below the predetermined threshold, the grid cell 141 is unoccupied 144. In FIG. 3, grid cells 143 are shown as occupied and grid cells 144 are shown as unoccupied. As indicated above, the determination of whether the grid cells 141 are occupied or unoccupied is based on the number of point cloud data points 140 assigned to the corresponding grid cell 141. In the example shown in FIG. 3, the number of point cloud data points 140 assigned to grid cells 144 is below the predetermined threshold (i.e., unoccupied) while the number of point cloud data points 140 assigned to grid cells 143 is above the predetermined threshold (i.e., occupied). As shown in FIG. 3, there are 10 occupied grid cells 143 and 32 unoccupied grid cells 144.

The mobile device 122 and/or the server 125 then generates a 2D occupancy grid 145 as the signature for the location along the region of the roadway 131. The 2D occupancy grid 145 may be generated based on the determined grid cell occupancy 143, 144 for the grid cells 141. Each grid cell 141 of the plurality of grid cells 141 also includes data indicative of the grid cell occupancy. As discussed above, the grid cell occupancy indicates whether the portion of the three-dimensional space represented by the grid cell 141 contains data for an object at the portion of the three-dimensional space. The mobile device 122 and/or the server 125 then encodes the 2D occupancy grids 145 as 2D occupancy images 150. This is shown in more detail in FIG. 4, discussed below.

Figure 4:
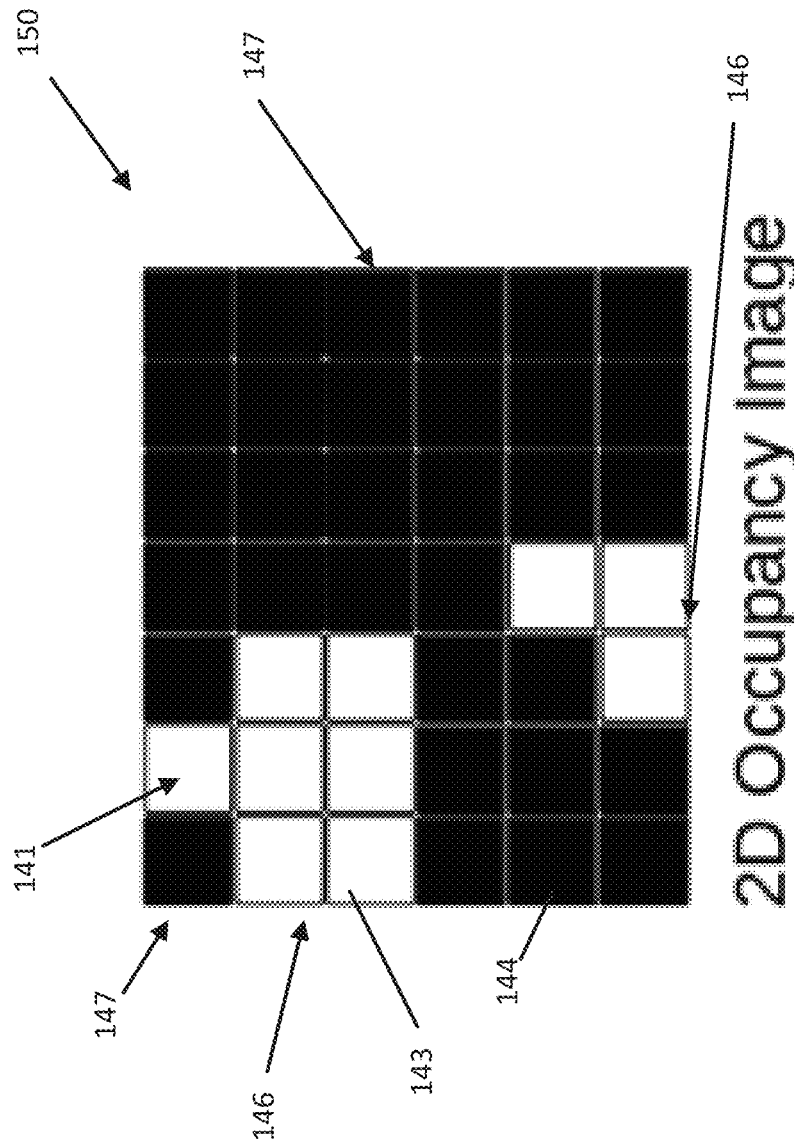
FIG. 4 illustrates the 2D occupancy grid of FIG. 3 encoded as a 2D binary occupancy image.

FIG. 4 illustrates the 2D occupancy grid 145 of FIG. 3 encoded as a 2D binary occupancy image 150. As indicated above, the mobile device 122 and/or the server 125 may generate 2D occupancy images 150 for the horizontal slices 132 of point cloud data 140. A 2D occupancy image 150 for a horizontal slice 132 of point cloud data 140 may represent a finite height of point cloud data 140. For example, the mobile device 122 and/or the server 125 may generate a 2D occupancy images 150 for each horizontal slice 132a-c of FIG. 3. As indicated above, the grid cell occupancy may be a binary indication (e.g., 1 or 0, on or off, + or −) that indicates whether a grid cell 141 includes data indicative of an object at the 3D space the grid cell 141 represents. For example, an indication of 1, on, or + may indicate that the grid cell is occupied, and an indication of 0, off, or − may indicate that the grid cell is unoccupied, or vice versa. Any binary indication having two possible values may be used, whether now known or later developed. As shown in FIG. 4, the binary indication of the occupancy of grid cells 141 is black and white, where black indicates unoccupied grid cells 144 and white indicates occupied grid cells 143. The white grid cells 143 corresponds to the grid cells of FIG. 3 containing point cloud data points 140.

The 2D binary occupancy image 150 may be generated by the mobile device 122 and/or the server 125 as an efficient description of objects that correspond to the location data and as a signature of the surrounding of the location data. Two-dimensional occupancy grids 145 encoded as a 2D binary image 150 require less memory and are faster to load, making applications, such as localization processes, faster and more efficient than compared with existing 2D occupancy grids and 3D occupancy grids. As stated above, the increased efficiency and usage of resources may lead to less downtime, quicker implementation time, fewer errors, and as such, more efficient use of vehicle applications, such as localization and navigation services. For example, the quicker implementation time and fewer errors may lead to more accurate up to date map data for navigation services. The mobile device 122 and/or the server 125 may also compress a 2D binary occupancy image 150 to further reduce the amount of computing and networking resources required to communicate and store the 2D binary occupancy image 150. The compressed, or simplified, 2D binary occupancy image 150 thus requires less storage and bandwidth requirements.

As discussed above, the mobile device 122 and/or the server 125 may provide the compressed 2D binary occupancy image 150 to content providers, such as a map developer 121 or an applications developer, to include the 2D binary occupancy image 150 in detailed maps of locations or applications, such as mobile applications, using location related information. The 2D binary occupancy image 150 may also be provided to end users, such as other mobile devices 122 or vehicles 124, in order to perform localization techniques. The 2D binary occupancy image 150 may be provided to other various services or providers as well, such as navigational services or traffic server providers.

As discussed above, in order for the mobile device 122 and/or the server 125 to detect vertical clusters of point cloud data 140, the mobile device 122 and/or the server 125 first determines occupied 143 and unoccupied 144 regions 146, 147 of the 2D occupancy images 150. Determining the occupied 143 and unoccupied 144 regions 146, 147 of the 2D occupancy images 150 may be based on a connected-component analysis. For example, an occupied region 146 is a grid cell 141 or group of grid cells 141 containing point cloud data 140 indicative of an object at the grid cell 141 or group of grid cells 141. Similarly, an unoccupied region 147 is a grid cell 141 or group of grid cells 141 that does not contain point cloud data 140 indicative of an object at the grid cell 141 or group of grid cells 141. As shown in FIG. 4, the cluster of white grid cells that represent occupied grid cells 143 form occupied regions 146 within the 2D occupancy image 150. The cluster of black grid cells that represent unoccupied grid cells 144 for unoccupied regions 147 of the 2D occupancy image 150. In the example shown in FIG. 4, there are two occupied regions 146 and two unoccupied regions 147.

The mobile device 122 and/or the server 125 then compares the occupied regions 146 of adjacent 2D occupancy images 150 and identifies groups of similar occupied regions 146 arranged vertically as vertical clusters of point cloud data 140 based on the comparison. The vertical clusters may also be referred to as connective components, where the components (i.e., occupied regions 146) are connected vertically. The occupied regions 146 are used to grow clusters in the vertical direction. For instance, the mobile device 122 and/or the server 125 may start with each occupied region 146 in the bottom most occupancy image 150 (i.e., the occupancy image 150 corresponding to the bottom most horizontal slice 132 of point cloud data 140) and then determine whether the same cells in the occupancy image 150 immediately above also contain the same or similar occupied region 146. When adjacent occupied regions 146 are identified, these occupied regions 146 are considered to "grow" vertically, meaning those components (i.e., adjacent occupied regions 146) become connected. These vertically grown regions of occupied grid cells 143 may then be identified as a vertical cluster. For example, referring back to FIG. 2, the mobile device 122 and/or the server 125 may first determine occupied regions 146 of a 2D occupancy image 150 associated with horizontal slice 132c of FIG. 2. Then, the mobile device 122 and/or the server 125 may determine occupied regions 146 of a 2D occupancy image 150 associated with horizontal slice 132b of FIG. 2. The mobile device 122 and/or the server 125 may then compare the occupied regions 146 of the 2D occupancy images 150 of horizontal slices 132c and 132b and identify groups of those occupied regions 146 that are similar between the horizontal slices 132c and 132b. Since horizontal slice 132b is adjacent and above horizontal slice 132c, if occupied regions 146 of the 2D occupancy image 150 associated with horizontal slice 132b are the same or similar to occupied regions 146 of the 2D occupancy image 150 associated with horizontal slice 132c, these groups of similar occupied regions 146 are arranged vertically and are considered to grow vertically from a lower 2D occupancy image 150 to a higher 2D occupancy image 150. These vertically aligned occupied regions 146 are referred to as a vertical cluster. The mobile device 122 and/or the server 125 may consider a number of predetermined parameters when identifying groups of similar occupied regions 146 arranged vertically as vertical clusters 151 of point cloud data 140. These parameters are described and discussed in more detail below in reference to FIG. 5.

Figure 5:
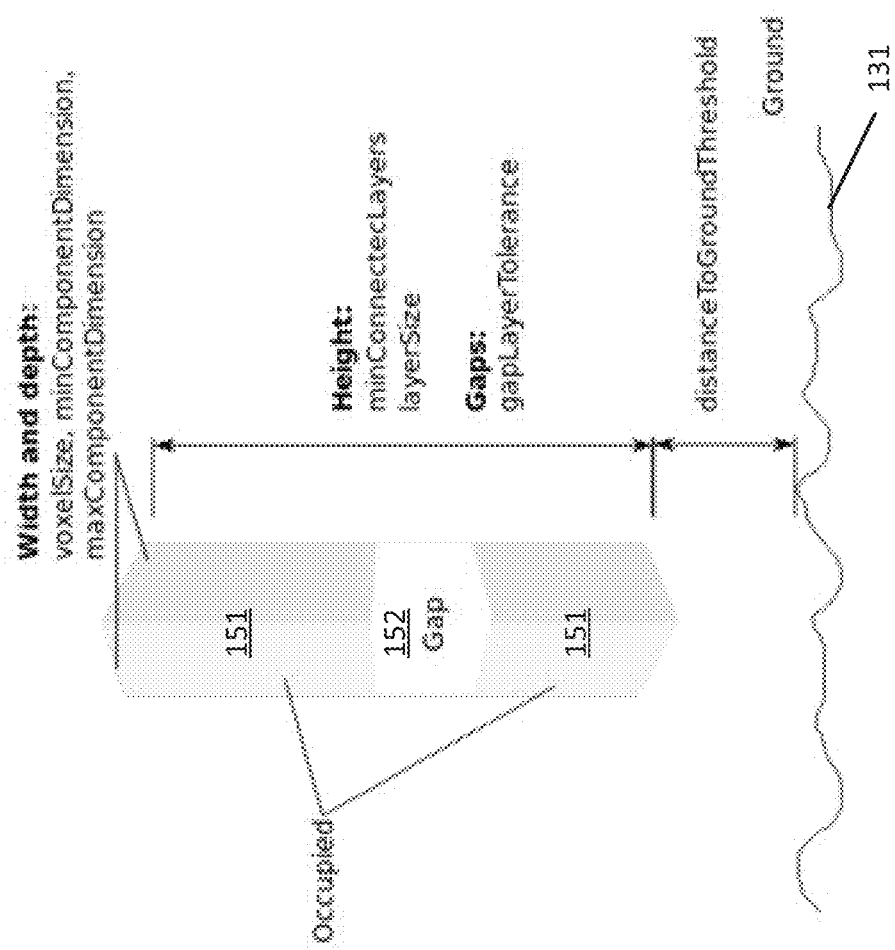
FIG. 5 illustrates an example vertical cluster of point cloud data and parameters used to determine whether the vertical cluster may represent a pole-like object.

FIG. 5 illustrates an example vertical cluster 151 of point cloud data 140 at a region of a roadway 131. FIG. 5 also illustrates various parameters used to determine whether the vertical cluster 151 may represent a pole-like object. As discussed above, the mobile device 122 and/or the server 125 may detect vertical clusters 151 of point cloud data 140 based on the 2D occupancy images 150 and then determine whether the vertical clusters 151 of point cloud data 140 represent pole-like objects. As discussed above, to detect vertical clusters 151 of point cloud data 140 based on the 2D occupancy images 150, the mobile device 122 and/or the server 125 determines occupied regions 146 of 2D occupancy images 150, compares the occupied regions 146 of adjacent 2D occupancy images 150, and identifies groups of similar occupied regions 146 arranged vertically as vertical clusters 151 of point cloud data 140 based on the comparison and predetermined parameters.

As shown in FIG. 5, there are several parameters used to control whether there is adequate proof that there is a vertical cluster 151, or pole-like object cluster, at each occupied region 146 or location. The parameters that the mobile device 122 and/or the server 125 may consider during vertical cluster 151 detection include minimum connected-component dimension, maximum connected-component dimension, number of layers or adjacent occupied regions 146 of adjacent 2D occupancy images 150 that can be connected without running into a gap, and distance from the ground. Other parameters may be used as well. The mobile device 122 and/or the server 125 may allow small gaps in the vertical direction in terms of a small number of layers to account for accidental gaps in the data 140. For instance, a predetermined gap thickness 152 or tolerance level may be used by the mobile device 122 and/or the server 125 when detecting vertical clusters 151. The mobile device 122 and/or the server 125 may also remove or discard clusters based on size. For example, small clusters (i.e., clusters of data points representing small structures) and large clusters (i.e., clusters of data points representing large structures) may be ignored by the mobile device 122 and/or the server 125, since it is likely that these sized clusters do not represent pole-like objects. Small clusters and large clusters, and/or the corresponding small and large structures represented by these clusters, may be based on predetermined size thresholds.

In order to determine whether the vertical clusters 151 of point cloud data 140 represent pole-like objects, the mobile device 122 and/or the server 125 classifies the vertical clusters 151 as either pole-like objects or non-pole-like objects. To classify the vertical clusters 151, the mobile device 122 and/or the server 125 calculates features that represent the vertical clusters 151 shape, orientation, size, and point density. The mobile device 122 and/or the server 125 then inputs the features into a pre-trained machine learning algorithm. As discussed above, the machine learning algorithm is pre-trained using annotators and a detector algorithm, where the annotators remove false-positives and add false-negatives of candidates of potential pole-like objects generated based on a sample number of vertical clusters 151 of point cloud data 140. Also as discussed above, training the machine learning algorithm may be an iterative process performed until a threshold percentage of pole-like objects at the location along the region of the roadway 131 are determined. The use of annotators, such as, for example, human annotators, in addition to the detection algorithm increases and improves the amount of training data used in the detection algorithm, which improves how roadside objects, such as pole-like objects, are detected. Classifying the vertical clusters 151 as either pole-like objects or non-pole-like objects and using annotators to improve the training of the detection algorithm acts as a filter to remove data points not associated with pole-like objects. Filtering the data points in this way reduces the amount of data points being processed, which increases efficiency and speed of the processing and requires less storage and bandwidth to operate the applications mentioned above.

Figure 6:
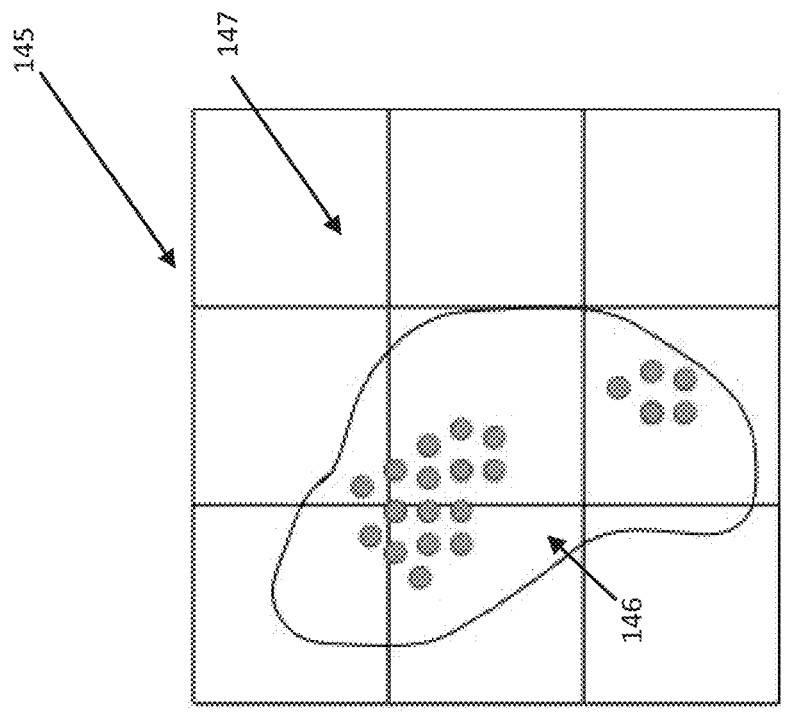
FIG. 6 illustrates the effect that a resolution parameter has on detecting vertical clusters of point cloud data.
Figure 6:
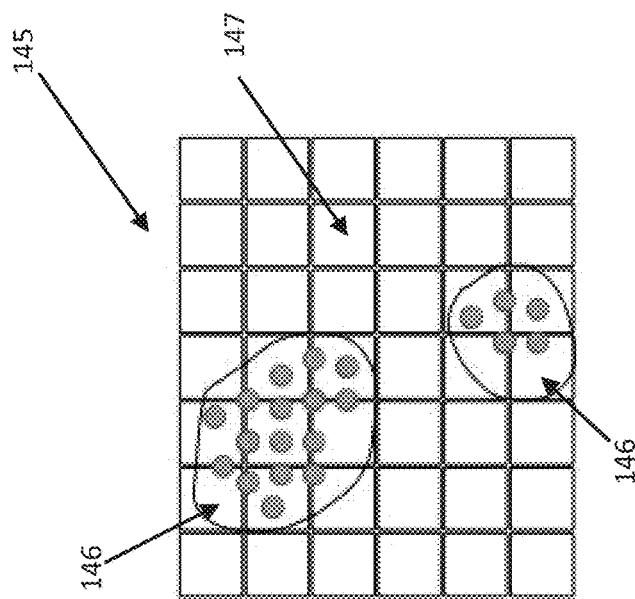

FIG. 6 illustrates the effect that a resolution parameter has on detecting vertical clusters 151 of point cloud data 140. A higher resolution (smaller voxel size) may lead to more cluster detections in the output, but not all of them may be actual pole-like objects, which results in a lower precision ratio. A smaller resolution (larger voxel size) may lead to less cluster detections in the output, but some true pole-like objects might be missed, which results in a higher precision, but lower recall ratio. As shown in FIG. 6, the 2D occupancy grid 145 on the left has a higher resolution (i.e., smaller voxel size) and results in two occupied regions 146, whereas the 2D occupancy grid 145 on the right has a lower resolution (i.e., larger voxel size) and results in only one occupied region 146. The 2D occupancy grid 145 on the left with the higher resolution may lead to an increased number of false positive detections (i.e., detecting more objects than are actually present), whereas the 2D occupancy grid 145 on the right having the lower resolution may lead to an increase number of false negative detections (i.e., not detecting objects when in fact an object may be present).

Figure 7:
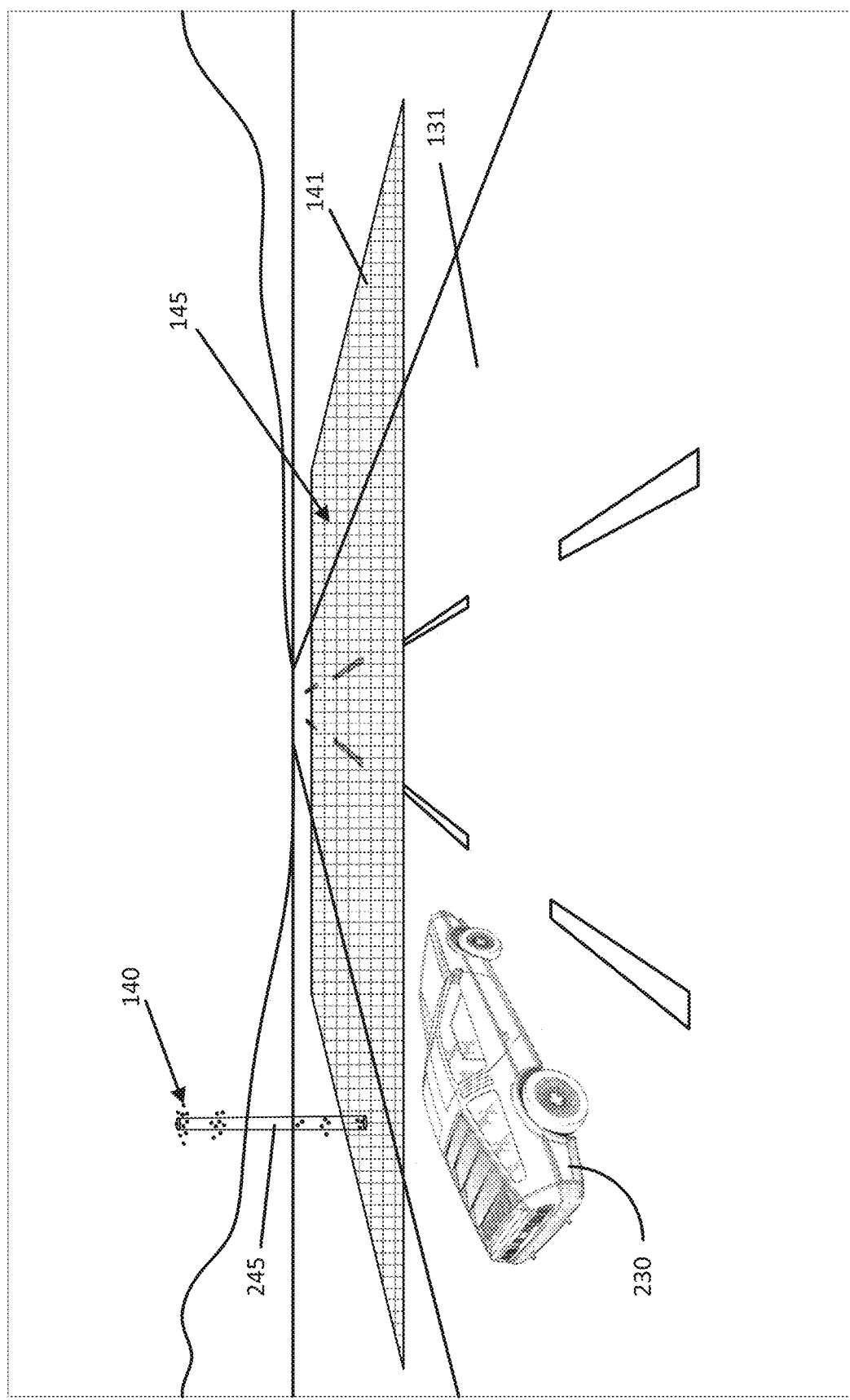
FIG. 7 illustrates an example 2D occupancy grid and a modeled pole-like object at a region of a roadway being used for localization.

FIG. 7 illustrates an example localization application for the 2D occupancy grid 145 and modeled pole-like object 245 at a region of a roadway 131. The roadway 131 is associated with 2D occupancy grids 145 at specific locations. In one example, a set of 2D occupancy grids is stored for each predetermined section of road, or chunk, of the roadway 131. For example, the vehicle 230 of FIG. 6 is traveling at a particular location of the roadway 131 associated with a 2D occupancy grid 145. As discussed above, the mobile device 122 and/or the server 125 may model vertical clusters 151 of point cloud data 140 as cylinders 245. To model vertical clusters 151 of point cloud data 140 as cylinders 245, the mobile device 122 and/or the server 125 may apply a cylinder fitting algorithm to the vertical clusters 151 of point cloud data 140. The mobile device 122 and/or the server 125 may then determine cylinder attributes based on the cylinder fitting algorithm.

In a localization technique, as a user (e.g., vehicle 230) travels down the region of the roadway 131, the location of a user at a region of a roadway 131 is identified. Modeled features associated with the location is then accessed. Modeled features, such as the modeled cylinder 245, may represent pole-like objects at the region of the roadway 131. The modeled features may be generated based on detected vertical clusters 151 of point cloud data 140 associated to corresponding regions along the region of the roadway 131. Next, sensor data is received from the user at the location of the region of the roadway 131 and compared with the modeled features, such as the modeled cylinder 245. The received data may be range data (e.g., LiDAR) or image data (e.g., camera). A comparison of the received data and the modeled features determines the location of the vehicle 230. In one example, the vehicle 230 is matched with the predetermined section of road. In another example, the vehicle 230 is matched with a relative location along the predetermined section of road.

Figure 8:
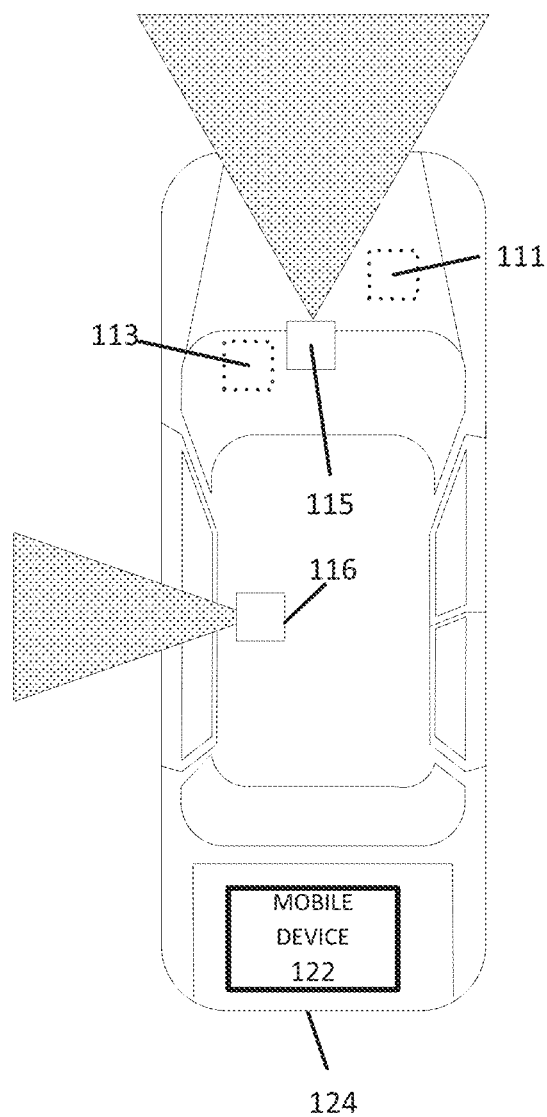
FIG. 8 illustrates an exemplary vehicle of the system of FIG. 1.

FIG. 8 illustrates an exemplary vehicle of the system of FIG. 1. FIG. 8 illustrates an example vehicle 124 for collecting data for the 2D occupancy grids 145 and/or for performing localization using the generated 2D occupancy grids 145, the modeled vertical clusters 151 of point cloud data 140 as cylinders 245, and subsequently collected distance data. A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS signal. Alternatively or additionally, the one or more detectors or sensors may include an accelerometer built or embedded into or within the interior of the vehicle 124.

In some alternatives, additional sensors may be included in the vehicle 124. An engine sensor 111 may include a throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to geographic data received from geographic database 123 and the server 125, which may have been updated according to the collection of data in the embodiments described herein. The assisted driving vehicle may select a route based on any of the examples herein, including in response to current location based on a comparison of the local sensor data to object polylines for a signature of the location.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order to pass the initial observation location or road object in response to the request for additional observations.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and the request for additional observations for the road object.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle.

In a localization technique, as a vehicle 124 travels down a region of a roadway 131, an onboard processor accesses modeled features associated with the region of the roadway 131. The onboard processor receives sensor data from the vehicle sensor array, including the optical distance system such as LiDAR 116 and the image capture system 115 such as a camera, from the region of the roadway 131 and compares the sensor data with the modeled features. The vehicle 124 performs localization based on the comparison of the sensor data with the modeled features.

Figure 9:
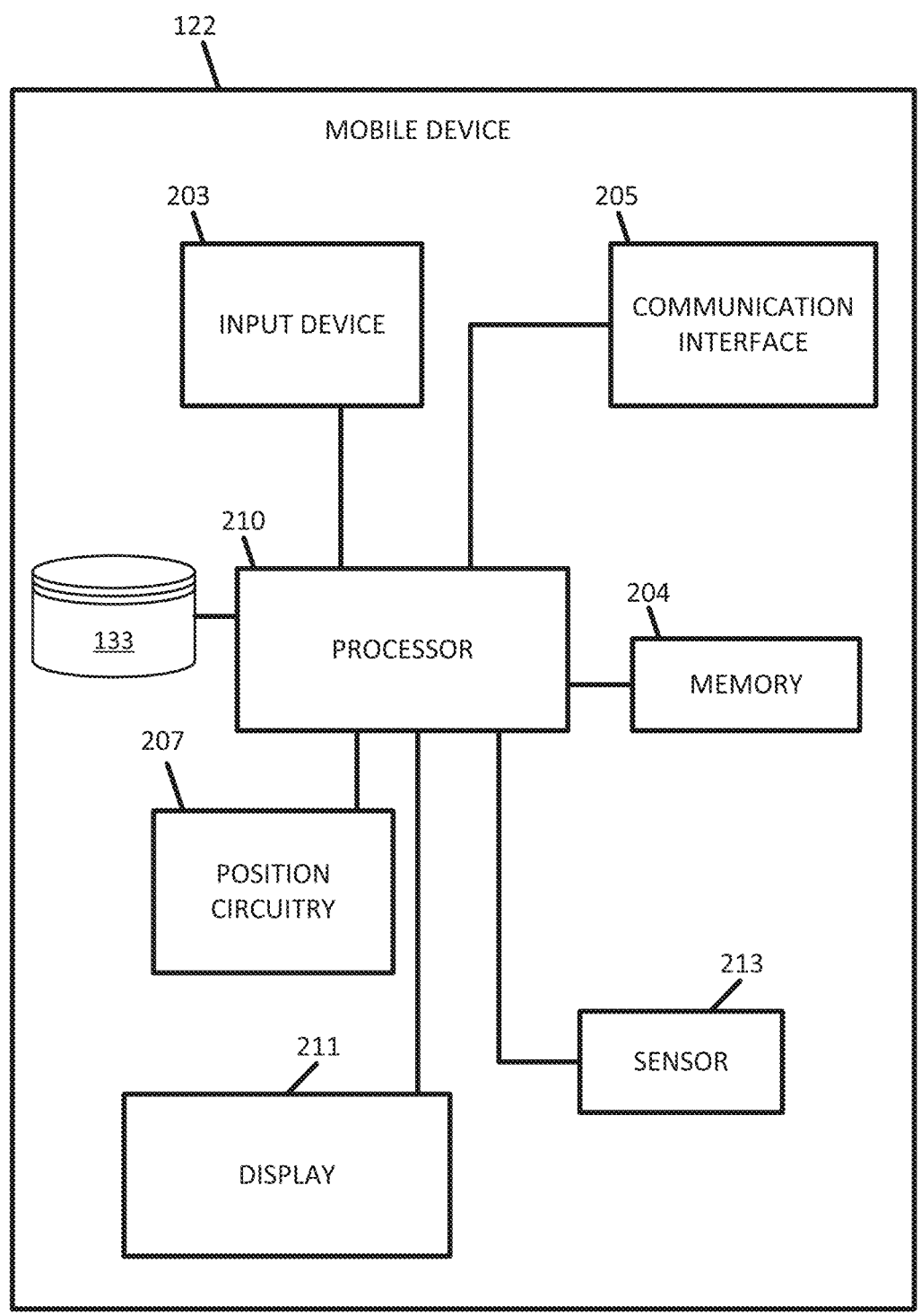
FIG. 9 illustrates an example mobile device.

FIG. 9 illustrates an exemplary mobile device 122 of the system of FIG. 1. The mobile device 122 includes a processor 210, a vehicle database 133, a memory 204, an input device 203, a communication interface 205, position circuitry 207, a display 211, and a sensor 213. The input device 203 may receive settings to enable or disable the mobile device for collecting observations. Additional, different, or fewer components are possible for the mobile device 122.

Figure 10:
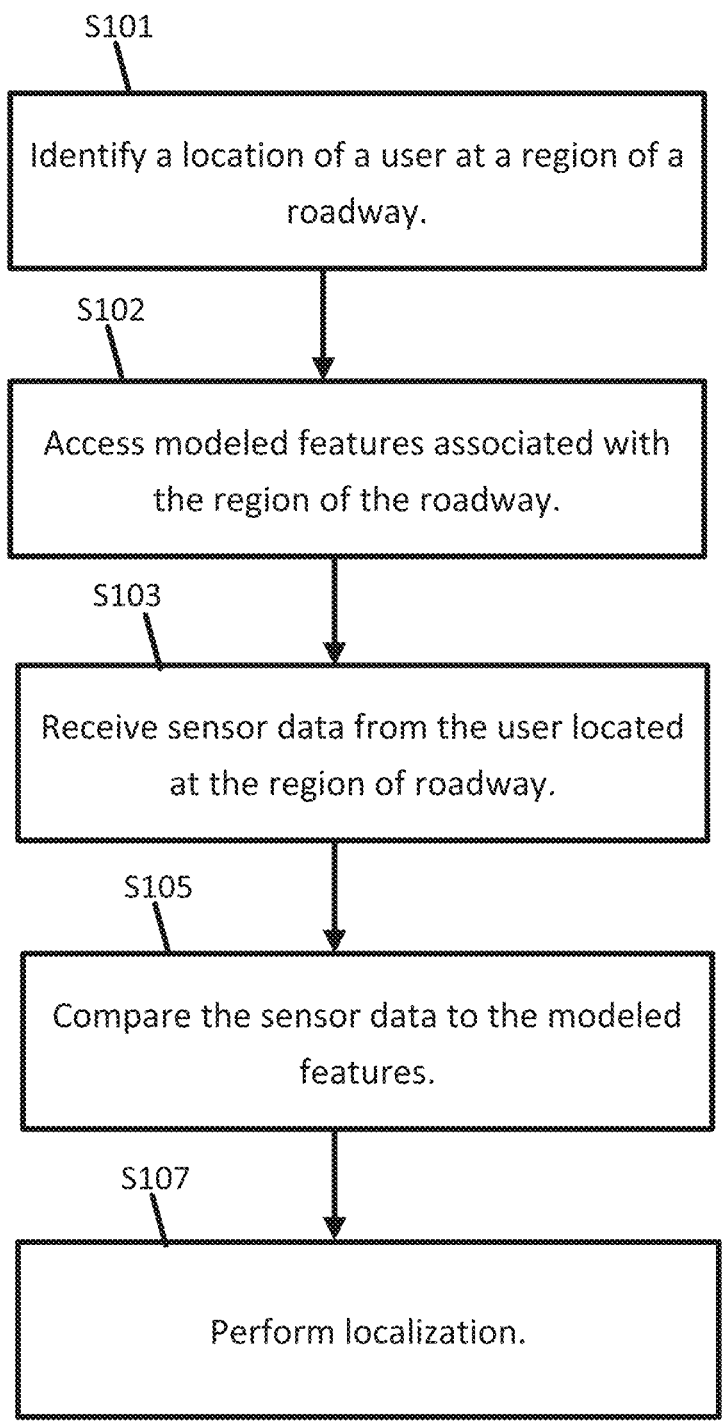
FIG. 10 illustrates an example localization technique.

FIG. 10 illustrates an example localization technique. Additional, different, or fewer steps may be included. For example, the acts may be performed in any order. For example, act S103 may precede act S102. The acts may be performed by a processor coupled to a memory. The acts may comprise instructions stored in memory to cause the processor to carry out the acts. Additionally or alternatively, the acts may be performed by a controller of a vehicle or by components of the controller. For example, the controller 701 described in more detail below in reference to FIG. 12 may perform the acts. The acts may be performed on the vehicle or on a server in communication with the vehicle.

At act S101, the location of a user (e.g., vehicle 230) at a region of a roadway 131 is identified. The location may be identified by processor 210. The location of the user 230 may be stored in the database 133 or memory 204 and may be associated with a region of a roadway 131 corresponding to the position of the mobile device 122. The position circuitry 207 or the processor 210 detects a geographic position of the mobile device 122 and may send the geographic location for the mobile device 122 to a server. The position circuitry 207 is one example means for detecting or determining a geographic position. The processor 210 also includes circuitry serving as means for detecting or determining a geographic position. The detected geographic position of the mobile device 122 may include a latitude and longitude pair. The geographic position may be detected or sampled at periodic intervals in time or distance, or may be continuously detected. The sensor 213, which may include distancing sensors, range sensor, image sensors, or another sensor may also provide information for determining the geographic position of the mobile device 122.

At act S102, modeled features associated with the region of the roadway are accessed. The modeled features may be accessed by the processor 210. The modeled features may represent pole-like objects at the region of the roadway 131, such as modeled cylinders 245, and may be stored in the database 133 or memory 204. The modeled features are associated with objects at the region of the roadway 131 corresponding to the position of the mobile device 122. The modeled features may be generated based on detected vertical clusters 151 of point cloud data 140 associated to corresponding regions along the region of the roadway 131. The modeled features may have been generated by the server based on determining whether the detected vertical clusters 151 of point cloud data 140 represent pole-like objects. The modeled features may also have been generated by the server as an efficient description of objects that correspond to the location data and as a signature of the surrounding of the location data.

At act S103, sensor data associated with the region of the roadway 131 is received. The sensor data may be received by the processor 210 or the communication interface 205. The communication interface 205 is an example for a means for receiving the sensor data. The processor 210 may include circuitry or a module or an application specific controller as a means for receiving the sensor data. The processor 210 or the communication interface 205 may receive sensor data from the vehicle sensor array, including the optical distance system such as LiDAR 116 and the image capture system 115 such as a camera. The processor 210 or the communication interface 205 may receive sensor data from the sensor 213, which may include distancing sensors, range sensor, image sensors, or another sensor as described with respect to FIG. 8.

At act S105, the sensor data received in act S103 is compared with the modeled features accessed in act S102. The comparison may be performed by the processor 210. The processor 210 may compare a value, or values, of each modeled feature to the corresponding sensor data. The value or values of the modeled feature may be a signature vector or may be values for each grid cell 141 of the 2D occupancy grid 145, and the sensor data may be arranged in a similar manner. The processor 210 may compare the signature to the sensor data to calculate a number of matching data points. The processor 210 may include circuitry or a module or an application specific controller as a means for comparing the sensor data to the modeled features.

At act S107, localization is performed. The processor 210 may calculate or determine a location for the mobile device 122 based on the comparison of act S105. The processor 210 may include circuitry or a module or an application specific controller as a means for determining the location of the mobile device 122 based on the modeled feature and sensor data comparison. The processor 210 may determine a number of matching points of a modeled feature based on the comparison of the signature to the vicinity data. When a certain number of points match, the processor 210 determines that the current location of the mobile device 122, or a location when the vicinity data was detected, corresponds to the modeled feature. The match may be determined when a predetermined quantity of points match the vicinity data. The match may be determined when a predetermined percentage of the points (e.g., 50%, 90%, or 99%) match the vicinity data. The position circuitry 207 may have determined an estimate of the geographic position, and the comparison of act S105 and the calculation of act S107 provides a refinement or otherwise improves on the accuracy of the estimate of the geographic position. Alternatively, the position circuitry 207 may be omitted and only the acts of S105 and S107 determine the geographic position.

Acts S101 through S107 may be performed automatically by the mobile device 122. For example, acts S101 through S107 may initiate whenever the geographic position of the mobile device 122 is detected or sampled. This may happen at periodic intervals in time or distance, or may be continuous as the mobile device 122 moves from location to location.

The processor 210 may include a routing module including an application specific module or processor that calculates routing between an origin and destination. The routing module is an example means for generating a routing command based on the current location of the mobile device 122 from the modeled feature comparison. The routing command may be a route from the route to the destination. The routing command may be a driving instruction (e.g., turn left, go straight), which may be presented to a driver or passenger, or sent to an assisted driving system. The display 211 is an example means for displaying the routing command. The routing command may be derived from a road network or map data stored in database 133. The database 133 is an example means for storing map data including a road network.

The mobile device 122 may generate a routing instruction based on the vehicle database 133. The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system, or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

Figure 11:
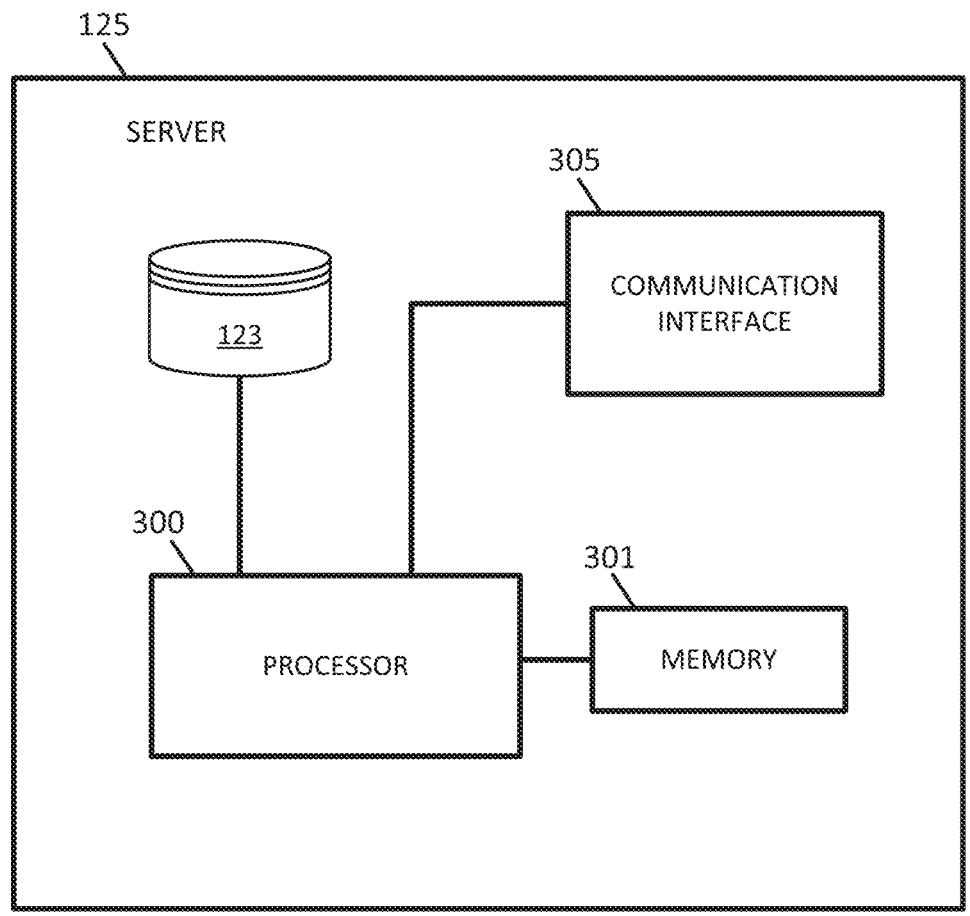
FIG. 11 illustrates an example server.

FIG. 11 illustrates an example server 125, which may apply to the system of FIG. 1. The server 125 includes a processor 300, a communication interface 305, a memory 301, and a database 123. An input device (e.g., keyboard or personal computer) may be used to enter settings to the server 125. Additional, different, or fewer components may be provided in the server 125. For example, the server 125 may also include a controller, such as, for example, the controller 701 described in more detail below in reference to FIG. 12.

Figure 12:
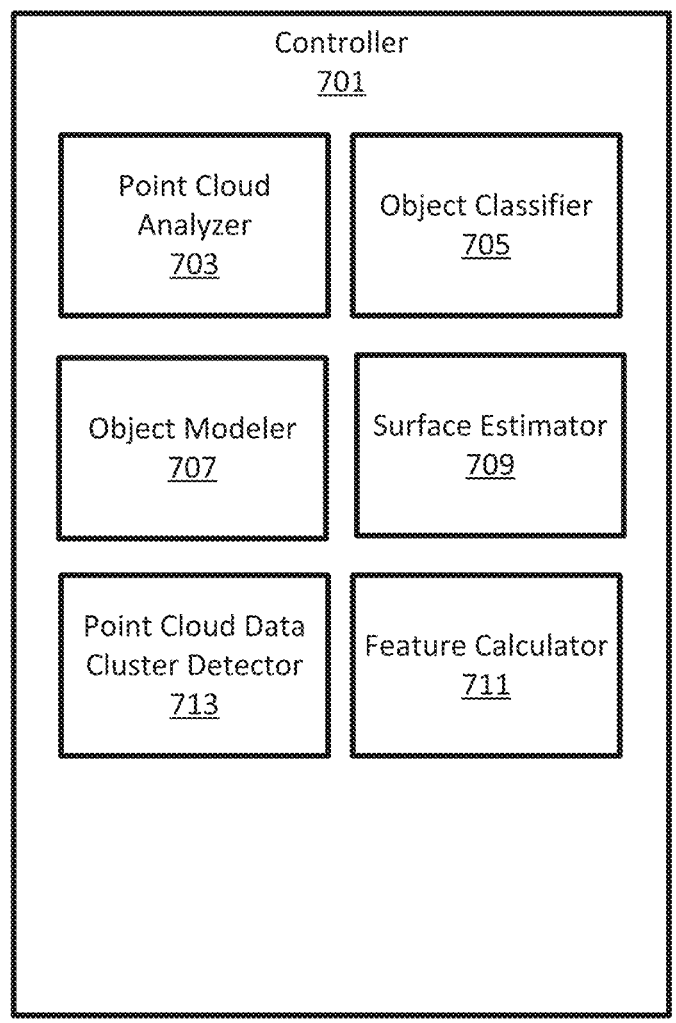
FIG. 12 illustrates an example controller.

FIG. 12 illustrates an example controller 701. The controller 701 may be part of a vehicle. Additionally or alternatively, all or part of the controller 701 may be implemented on a server in communication with the vehicle. The controller may include a point cloud analyzer 703, an object classifier 705, an object modeler 707, a surface estimator 709, a point cloud data cluster detector 713, and a feature calculator 711. More or fewer components may be included. For example, the controller 701 may not include a surface estimator or a feature calculator 711. In another example, the controller 701 includes a positioning system or an interface for vehicle guidance. One or more components of the controller 701 may be implemented on a vehicle or on a server in communication with the vehicle. For example, all of the components 703-711 may be implemented on the vehicle. In another example, the object classifier 705, object modeler 707, and feature calculator 711 may be implemented on a server. The server may communicate with the vehicle through a network connection. The network connection may be a cellular connection.

The point cloud analyzer 703 may be configured to identify horizontal slices 132 of point cloud data 140 based on a predetermined horizontal slice thickness or a predetermined resolution. The point cloud analyzer 703 may also be configured to generate 2D occupancy images for the horizontal slices 132 of point cloud data 140. As discussed above, the 2D occupancy image for a horizontal slice 132 of point cloud data 140 may represent a finite height of point cloud data 140. The point cloud analyzer 703 may also be configured to detect vertical clusters 151 of point cloud data 140 based on 2D occupancy images 150. The point cloud analyzer 703 may be connected to or in communication with communication interface 205 and/or communication interface 305.

The point cloud analyzer 703 may also be configured to associate the point cloud data 140 to respective horizontal slices 132 of point cloud data 140 based on the predetermined horizontal slice thickness 134 or the predetermined resolution and exclude the point cloud data 140 estimated to be associated with the road surface at the location along the region of the roadway 131 from the horizontal slices 132 of point cloud data 140. The point cloud analyzer 703 may further be configured to assign the point cloud data 140 in respective horizontal slices 132 of point cloud data 140 to corresponding grid cells 141, determine a grid cell occupancy 143, 144 for the grid cells 141, generate 2D occupancy grids 145 based on the determined grid cell occupancy 143, 144 for the grid cells 141, and encode the 2D occupancy grids 145 as 2D occupancy images 150.

The object classifier 705 may be configured to determine whether the vertical clusters 151 of point cloud data 140 represent pole-like objects. The object classifier 705 may also be configured to input the features calculated by the feature calculator 711 into a pre-trained machine learning algorithm to determine whether the vertical clusters 151 of point cloud data 140 represent pole-like objects.

The object modeler 707 may be configured to model the vertical clusters 151 of point cloud data 140 as cylinders 245. The object modeler 707 may be further configured to apply a cylinder fitting algorithm to the vertical clusters 151 of point cloud data 140 and determine cylinder attributes based on the cylinder fitting algorithm.

The surface estimator 709 may be configured to estimate point cloud data 140 associated with a road surface at the location along the region of the roadway 131.

The point cloud data cluster detector 713 may be configured to determine occupied regions 146 and unoccupied regions 147 of the 2D occupancy images 150 based on a connected-component analysis. As mentioned above, an occupied region 146 is a grid cell 141 or group of grid cells 141 containing point cloud data 140 indicative of an object at the grid cell 141 or group of grid cells 141. The point cloud data cluster detector 713 may also be configured to compare the occupied regions 146 of adjacent 2D occupancy images 150 and identify groups of similar occupied regions 146 arranged vertically as vertical clusters 151 of point cloud data 140 based on the comparison as well as predetermined parameters.

The feature calculator 711 may be configured to calculate features that represent vertical cluster 151 shape, orientation, size, and point density.

Figure 13:
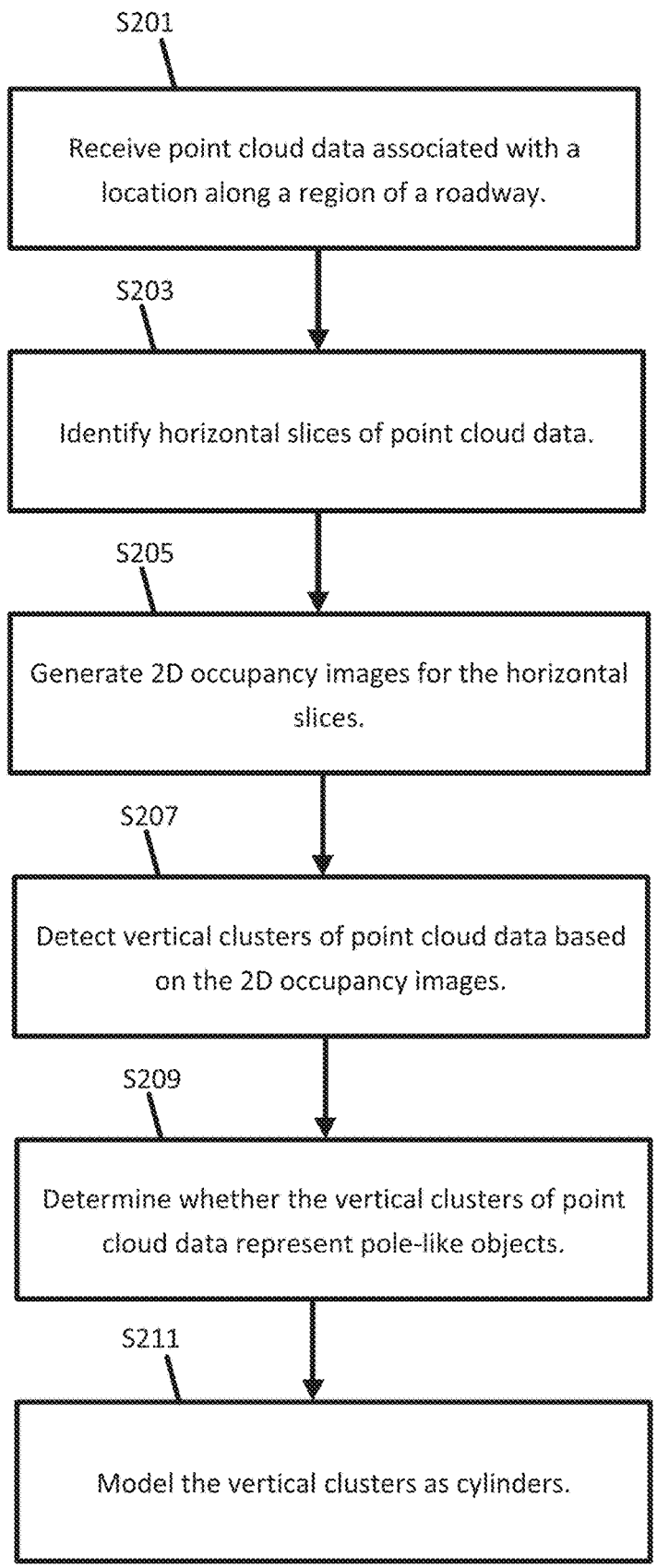
FIG. 13 illustrates an example modeling technique.

FIG. 13 illustrates an example modeling technique. Additional, different, or fewer acts may be provided. The acts may be performed by a processor coupled to a memory. The acts may comprise instructions stored in memory to cause the processor to carry out the acts. Additionally or alternatively, the acts may be performed by a controller of a vehicle or by components of the controller. For example, the controller 701 described in detail above in reference to FIG. 12 may perform the acts. The acts may be performed on the vehicle or on a server in communication with the vehicle.

At act S201, point cloud data 140 associated with a location along a region of a roadway 131 is received. The processor 300 or communication interface 305 may receive the associated point cloud data 140. The point cloud data 140 may be generated by the mobile device 122 or the optical distance system such as LiDAR 116 and the image capture system 115 such as a camera of the vehicle 124. The point cloud data 140 may include latitude, longitude, and altitude values. The communication interface 305 may be means for receiving the point cloud data 140. The processor 300 may include circuitry or a module or an application specific controller as a means for receiving the point cloud data 140 for the region of the roadway 131. The point cloud data 140 may be divided into longitudinal sections along the length of the region of the roadway 131. The point cloud data 140 may be analyzed in these sections such that certain portions of the point cloud data 140 corresponds to one of the longitudinal sections.

At act S203, horizontal slices 132 of point cloud data 140 are identified. The processor 300 may identify the horizontal slices 132 of point cloud data 140 based on a predetermined horizontal slice thickness 134 or a predetermined resolution. The processor 300 may include circuitry or a module or an application specific controller as a means for identifying the horizontal slices 132 of point cloud data 140.

At act S205, 2D occupancy images 150 for the horizontal slices 132 of point cloud data 140 are generated. The processor 300 may generate the 2D occupancy images 150 based on a determined grid cell occupancy 143, 144 for grid cells 141 and a generated 2D occupancy grid 145. The processor 300 may include circuitry or a module or an application specific controller as a means for generating the 2D occupancy images 150. The 2D occupancy grid 145 and/or the 2D binary occupancy image 150 may be stored in the memory 301 or database 123. The processor 300 may also compress the 2D binary occupancy image 150 to further reduce the amount of computing and networking resources required to communicate and store the 2D binary occupancy image 150. As discussed above, the server 125 may provide the compressed 2D binary occupancy image 150 to content providers, such as a map developer 121 or an applications developer, to include the 2D binary occupancy image 150 in detailed maps of locations or applications, such as mobile applications, using location related information. The 2D binary occupancy image 150 may also be provided to end users, such as other mobile devices 122 or vehicles 124, in order to perform localization techniques. The 2D binary occupancy image 150 may be provided to other various services or providers as well, such as navigational services or traffic server providers.

At act S207, vertical clusters 151 of point cloud data 140 are detected. The processor 300 may detect vertical clusters 151 of point cloud data 140 based on the 2D occupancy images 150 that were generated in act S205. The processor 300 may include circuitry or a module or an application specific controller as a means for detecting vertical clusters 151 of point cloud data 140 based on the 2D occupancy images 150. The processor 300 may determine occupied 143 and unoccupied 144 regions 146, 147 of the 2D occupancy images 150 based on a connected-component analysis. The processor 300 may include circuitry or a module or an application specific controller as a means for determining occupied 143 and unoccupied 144 regions 146, 147 of the 2D occupancy images 150. The processor 300 may compare the occupied regions 146 of adjacent 2D occupancy images 150 and then identify groups of similar occupied regions 146 arranged vertically as vertical clusters 151 of point cloud data 140 based on the comparison and predetermined parameters.

At act S209, it is determined whether the vertical clusters 151 of point cloud data 140 represent pole-like objects. The processor 300 may make this determination. The processor 300 may include circuitry or a module or an application specific controller as a means for determining whether the vertical clusters 151 of point cloud data 140 represent pole-like objects. The processor 300 may calculate features that represent the vertical clusters 151 shape, orientation, size, and point density. The processor 300 may input the features into a pre-trained machine learning algorithm to determine whether the vertical clusters 151 of point cloud data 140 represent pole-like objects. The processor 300 may receive training data from annotators and re-perform the steps discussed above in an iterative process until a threshold percentage of vertical clusters 151 are determined to represent pole-like objects.

At act S211, the vertical clusters 151 of point cloud data 140 are modeled as cylinders 245. The processor 300 may model the vertical clusters 151 of point cloud data 140 as cylinders 245. The processor 300 may include circuitry or a module or an application specific controller as a means for modeling the vertical clusters 151 as cylinders 245. The processor 300 may apply a cylinder fitting algorithm to the vertical clusters 151 of point cloud data 140 and determine cylinder attributes based on the cylinder fitting algorithm.

Figure 14:
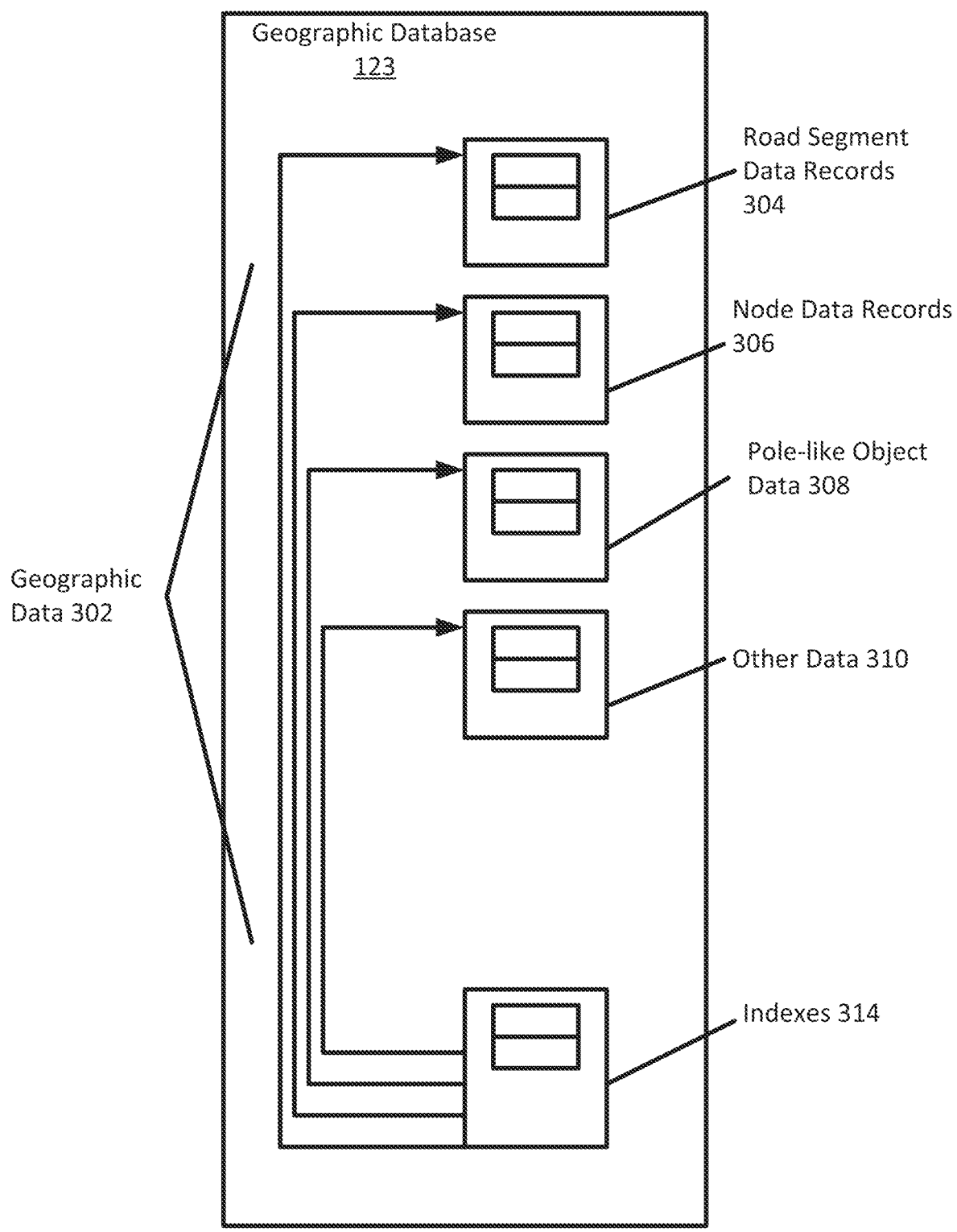
FIGS. 14 and 15 illustrate example geographic databases.

In FIG. 14, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include 2D occupancy grid and/or 2D binary occupancy image data or other types of location fingerprint data, such as modeled feature data, for specific locations in a particular geographic region. The road segments, nodes, and other features in the database 123 may be stored according to the segmented path coordinate system (SPCS) such that each feature includes at least one location defined by a distance along the path, a transverse distance from the path, and a height above the path.

The geographic database 123 may include other kinds of data 310. The other kinds of data 310 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate pole-like object data 308 describing the location of one or more objects in proximity to a road segment in the segment data records 304 or a geographic coordinate. An index 314 may, for example, store pole-like object data 308 relating to one or more locations. The pole-like object data 308 for the objects may include a format for SPCS including a distance along the path, a transverse distance from the path, and a height above the path.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, physical structures built on top of or around the road (e.g., bridges, overpasses, tunnels, buildings, parking lots, plazas or parks, monuments, railroad tracks, etc.), and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 15:
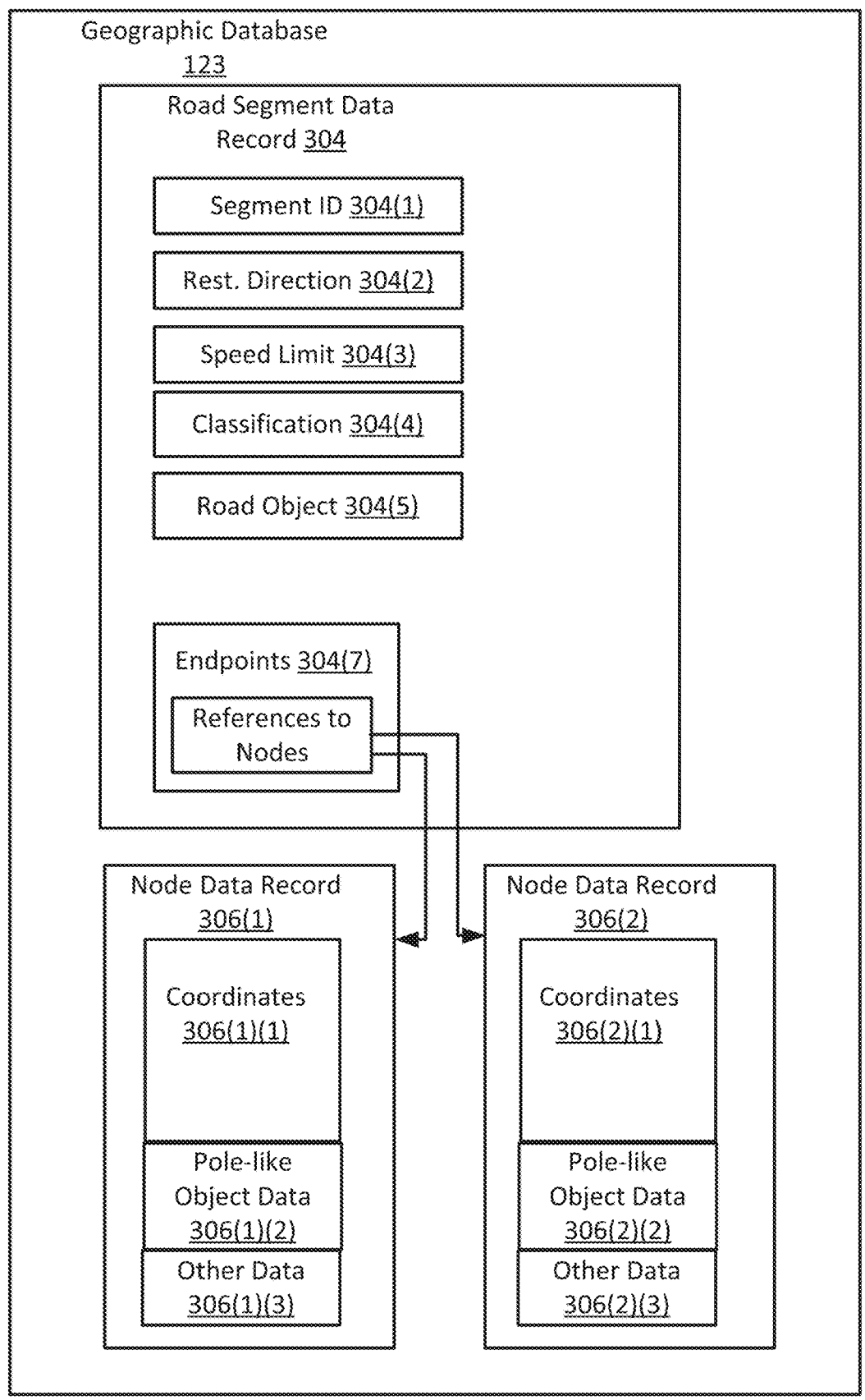

FIG. 15 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include 2D occupancy grid data or other types of location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a 2D occupancy grid or other types of location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment. In another embodiment, the data 304(7) provides SPCE coordinates for the road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 15 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and pole-like object data 306(1)(2) and 306(2)(2), which may include boundaries, dimensions, or other identifiers of the pole-like objects. The pole-like object data 306 (1)(2) and 306(2)(2) may change dynamically or over time. The node data records 306(1) and 306(2) may also include other data 306(1)(3) and 306(2)(3) that refer to various other attributes of the nodes. The pole-like object data 306(1)(2) and 306(2)(2) may be used for map matching with location data from a vehicle.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used The geographic database 123 and the data stored within the geographic database 123 may be licensed or delivered on-demand. Other navigational services or traffic server providers may access the 2D occupancy grid data or other types of location fingerprint data, traffic data and/or the lane line object data stored in the geographic database 123.

The databases 123 and 133 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The database 123 may be master geographic databases stored in a format that facilitates updating, maintenance, and development. For example, a master geographic database or data in the master geographic database is in an Oracle spatial format or other spatial format, such as for development or production purposes. The Oracle spatial format or development/production database may be compiled into a delivery format such as a geographic data file (GDF) format. The data in the production and/or delivery formats may be compiled or further compiled to form geographic database products or databases that may be used in end user navigation devices or systems.

For example, geographic data is compiled (such as into a physical storage format (PSF) format) to organize and/or configure the data for performing navigation-related functions and/or services, such as route calculation, turn by turn navigation instructions, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

The memory 301 may be configured to store the 2D occupancy grid 145 and/or the 2D binary occupancy images 150, as well as the modeled features, such as the modeled cylinders 245. That is, 2D occupancy grids 145 and/or 2D binary occupancy images 150, as well as the modeled features, may be stored and associated for the entire region of roadway 131. Thus, memory 301 is a means for storing the 2D occupancy grids 145 and/or the 2D binary occupancy images 150, as well as the modeled features, in a particular order dependent on the length of the region of roadway 131.

The communication interface 305 may send the generated 2D occupancy grids 145, the 2D occupancy images 150, and/or the modeled cylinders 245 to the mobile device 122 or vehicle 124 in response to receiving location data from the mobile device 122. The processor 300 may query the geographic database 123 with the location data to select the localization geometry, which may include a 2D occupancy grid 145, a 2D occupancy image 150, and/or a modeled cylinder 245.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Communication between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

The processor 210 and/or processor 300 may include a general processor, digital signal processor, an application specific integrated circuit (ASIC), field programmable gate array (FPGA), analog circuit, digital circuit, combinations thereof, or other now known or later developed processor. The processor 210 and/or processor 800 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for automatically detecting pole-like objects for a location along a region of a roadway, the method comprising:

receiving, by a processor, point cloud data associated with the location along the region of a roadway;

identifying, by the processor, horizontal slices of point cloud data based on a predetermined horizontal slice thickness or a predetermined resolution;

generating, by the processor, two-dimensional (2D) occupancy images for the horizontal slices of point cloud data, wherein a 2D occupancy image for a horizontal slice of point cloud data represents a finite height of point cloud data;

detecting, by the processor, vertical clusters of point cloud data based on the 2D occupancy images;

determining, by the processor, whether the vertical clusters of point cloud data represent pole-like objects; and modeling, by the processor, the vertical clusters of point cloud data as cylinders.

Embodiment 2

The method of embodiment 1, wherein identifying horizontal slices of point cloud data comprises:
associating the point cloud data to respective horizontal slices of point cloud data based on the predetermined horizontal slice thickness or resolution;
estimating point cloud data associated with a road surface at the location along the region of the roadway; and
excluding the point cloud data estimated to be associated with the road surface at the location along the region of the roadway from the horizontal slices of point cloud data.

Embodiment 3

The method of embodiment 1 or 2, wherein generating the 2D occupancy images comprises:
assigning the point cloud data in respective horizontal slices of point cloud data to corresponding grid cells;
determining a grid cell occupancy for the grid cells;
generating 2D occupancy grids based on the determined grid cell occupancy for the grid cells; and
encoding the 2D occupancy grids as 2D occupancy images.

Embodiment 4

The method of any of embodiments 1 to 3, wherein determining the grid cell occupancy comprises:
determining a number of point cloud data points assigned to a corresponding grid cell; and
determining whether the corresponding grid cell is occupied or unoccupied, wherein, when the number of point cloud data points assigned to the corresponding grid cell is above a predetermined threshold, the grid cell is occupied, and wherein, when the number of point cloud data points assigned to the corresponding grid cell is below the predetermined threshold, the grid cell is unoccupied.

Embodiment 5

The method of any of embodiments 1 to 4, wherein the 2D occupancy grids comprise a plurality of grid cells representing a three-dimensional space, wherein a grid cell of the plurality of grid cells represents a portion of the three-dimensional space and includes data indicative of the grid cell occupancy, wherein the grid cell occupancy indicates whether the portion of the three-dimensional space represented by the grid cell contains data for an object at the portion of the three-dimensional space.

Embodiment 6

The method of any of embodiments 1 to 5, wherein detecting vertical clusters of point cloud data comprises:
determining occupied and unoccupied regions of the 2D occupancy images based on a connected-component analysis, wherein an occupied region is a grid cell or group of grid cells containing point cloud data indicative of an object at the grid cell or group of grid cells;
comparing the occupied regions of adjacent 2D occupancy images; and
identifying groups of similar occupied regions arranged vertically as vertical clusters of point cloud data based on the comparison and predetermined parameters.

Embodiment 7

The method of any of embodiments 1 to 6, wherein determining whether the vertical clusters of point cloud data represent pole-like objects comprises:
calculating features that represent the vertical clusters shape, orientation, size, and point density; and
inputting the features into a pre-trained machine learning algorithm to determine whether the vertical clusters of point cloud data represent pole-like objects.

Embodiment 8

The method of any of embodiments 1 to 7, wherein the machine learning algorithm is pre-trained using annotators and a detector algorithm, wherein the annotators remove false-positives and add false-negatives of candidates of potential pole-like objects generated based on a sample number of vertical clusters of point cloud data.

Embodiment 9

The method of any of embodiments 1 to 8, wherein training the machine learning algorithm is an iterative process performed until a threshold percentage of pole-like objects at the location along the region of the roadway are determined.

Embodiment 10

The method of any of embodiments 1 to 9, wherein modeling the vertical clusters of point cloud data comprises:
applying a cylinder fitting algorithm to the vertical clusters of point cloud data; and
determining cylinder attributes based on the cylinder fitting algorithm.

Embodiment 11

An apparatus, configured to perform and/or control the method of any of embodiments 1-10 or comprising means for performing and/or controlling any of embodiments 1-10.

Embodiment 12

An apparatus, comprising at least one processor and at least one memory including computer program code for one or more programs, the at least one memory and the computer program code configured to, with the at least one processor, to perform and/or control the method of any of embodiments 1-10.

Embodiment 13

A computer program comprising instructions operable to cause a processor to perform and/or control the method of any of embodiments 1-10, when the computer program is executed on the processor.

We claim:
1. A method for automatically detecting pole-like objects for a location along a region of a roadway, the method comprising:
receiving, by a processor, point cloud data associated with the location along the region of a roadway;

identifying, by the processor, horizontal slices of point cloud data based on a predetermined horizontal slice thickness or a predetermined resolution;

generating, by the processor, two-dimensional (2D) occupancy images for the horizontal slices of point cloud data, wherein a 2D occupancy image for a horizontal slice of point cloud data represents a finite height of point cloud data;

detecting, by the processor, vertical clusters of point cloud data based on the 2D occupancy images;

determining, by the processor, whether the vertical clusters of point cloud data represent pole-like objects; and modeling, by the processor, the vertical clusters of point cloud data as cylinders.

2. The method of claim 1, wherein identifying horizontal slices of point cloud data comprises:

associating the point cloud data to respective horizontal slices of point cloud data based on the predetermined horizontal slice thickness or resolution;

estimating point cloud data associated with a road surface at the location along the region of the roadway; and excluding the point cloud data estimated to be associated with the road surface at the location along the region of the roadway from the horizontal slices of point cloud data.

3. The method of claim 1, wherein generating the 2D occupancy images comprises:

assigning the point cloud data in respective horizontal slices of point cloud data to corresponding grid cells;

determining a grid cell occupancy for the grid cells;

generating 2D occupancy grids based on the determined grid cell occupancy for the grid cells; and storing the 2D occupancy grids as 2D occupancy images.

4. The method of claim 3, wherein determining the grid cell occupancy comprises:

determining a number of point cloud data points assigned to a corresponding grid cell; and determining whether the corresponding grid cell is occupied or unoccupied, wherein, when the number of point cloud data points assigned to the corresponding grid cell is above a predetermined threshold, the grid cell is occupied, and wherein, when the number of point cloud data points assigned to the corresponding grid cell is below the predetermined threshold, the grid cell is unoccupied.

5. The method of claim 3, wherein the 2D occupancy grids comprise a plurality of grid cells representing a three-dimensional space, wherein a grid cell of the plurality of grid cells represents a portion of the three-dimensional space and includes data indicative of the grid cell occupancy, wherein the grid cell occupancy indicates whether the portion of the three-dimensional space represented by the grid cell contains data for an object at the portion of the three-dimensional space.

6. The method of claim 1, wherein detecting vertical clusters of point cloud data comprises:

determining occupied and unoccupied regions of the 2D occupancy images based on a connected-component analysis, wherein an occupied region is a grid cell or group of grid cells containing point cloud data indicative of an object at the grid cell or group of grid cells;

comparing the occupied regions of adjacent 2D occupancy images; and identifying groups of similar occupied regions arranged vertically as vertical clusters of point cloud data based on the comparison and predetermined parameters.

7. The method of claim 1, wherein determining whether the vertical clusters of point cloud data represent pole-like objects comprises:

calculating features that represent the vertical clusters shape, orientation, size, and point density; and inputting the features into a pre-trained machine learning algorithm to determine whether the vertical clusters of point cloud data represent pole-like objects.

8. The method of claim 7, wherein the machine learning algorithm is pre-trained using human annotators and a detector algorithm, wherein the human annotators inspect candidates of potential pole-like objects generated by the detector based on a sample number of vertical clusters of point cloud data and remove false-positives and add false-negatives of the candidates of potential pole-like objects.

9. The method of claim 8, wherein training the machine learning algorithm is an iterative process performed until a threshold percentage of pole-like objects at the location along the region of the roadway are determined.

10. The method of claim 1, wherein modeling the vertical clusters of point cloud data comprises:

applying a cylinder fitting algorithm to the vertical clusters of point cloud data; and determining cylinder attributes based on the cylinder fitting algorithm.

11. An apparatus for detecting pole-like objects for a location along a region of a roadway, the apparatus comprising:

a communication interface configured to receive point cloud data associated with the location along the region of the roadway;

a point cloud analyzer configured to identify horizontal slices of point cloud data based on a predetermined horizontal slice thickness or a predetermined resolution, generate 2D occupancy images for the horizontal slices of point cloud data, wherein a 2D occupancy image for a horizontal slice of point cloud data represents a finite height of point cloud data, and detect vertical clusters of point cloud data based on the 2D occupancy images;

an object classifier configured to determine whether the vertical clusters of point cloud data represent pole-like objects, and an object modeler configured to model the vertical clusters of point cloud data as cylinders.

12. The apparatus of claim 11, further comprising:

a surface estimator configured to estimate point cloud data associated with a road surface at the location along the region of the roadway, wherein the point cloud analyzer is further configured to associate the point cloud data to respective horizontal slices of point cloud data based on the predetermined horizontal slice thickness or the predetermined resolution and exclude the point cloud data estimated to be associated with the road surface at the location along the region of the roadway from the horizontal slices of point cloud data.

13. The apparatus of claim 11, wherein the point cloud analyzer is further configured to assign the point cloud data in respective horizontal slices of point cloud data to corresponding grid cells, determine a grid cell occupancy for the grid cells, generate 2D occupancy grids based on the determined grid cell occupancy for the grid cells, and store the 2D occupancy grids as 2D occupancy images.

14. The apparatus of claim 11, further comprising:

a point cloud data cluster detector configured to determine occupied and unoccupied regions of the 2D occupancy images based on a connected-component analysis, wherein an occupied region is a grid cell or group of grid cells containing point cloud data indicative of an object at the grid cell or group of grid cells, compare the occupied regions of adjacent 2D occupancy images, and identify groups of similar occupied regions arranged vertically as vertical clusters of point cloud data based on the comparison and predetermined parameters.

15. The apparatus of claim 11, further comprising:
a feature calculator configured to calculate features that represent the vertical clusters shape, orientation, size, and point density,
wherein the object classifier is configured to input the features into a pre-trained machine learning algorithm to determine whether the vertical clusters of point cloud data represent pole-like objects.

16. The apparatus of claim 15, wherein the machine learning algorithm is pre-trained using human annotators and a detector algorithm, wherein the human annotators inspect candidates of potential pole-like objects generated by the detector based on a sample number of vertical clusters of point cloud data and remove false-positives and add false-negatives of the candidates of potential pole-like objects.

17. The apparatus of claim 16, wherein training the machine learning algorithm is an iterative process performed until a threshold percentage of pole-like objects at the location along the region of the roadway are determined.

18. The apparatus of claim 11, wherein the object modeler is further configured to apply a cylinder fitting algorithm to the vertical clusters of point cloud data and determine cylinder attributes based on the cylinder fitting algorithm.

19. A non-transitory computer-readable medium encoded with instructions that, when executed by a processor, perform:
identifying a location of a user at a region of a roadway;
accessing modeled features associated with the region of the roadway, wherein the modeled features represent pole-like objects at the region of the roadway, and wherein the modeled features are generated based on detected vertical clusters of point cloud data associated to corresponding regions along the region of the roadway;
receiving sensor data from the user located at the region of the roadway;
comparing the modeled features and the received sensor data; and
performing localization of the user located at the region of the roadway based on the comparison.

20. The non-transitory computer-readable medium of claim 19, wherein the instructions encoded on the at least one non-transitory computer-readable medium, when executed by the processor to generate the modeled features, identify horizontal slices of the point cloud data based on a predetermined horizontal slice thickness or resolution by associating the point cloud data to respective horizontal slices of point cloud data based on the predetermined horizontal slice thickness or resolution, generate 2D occupancy images for the horizontal slices of point cloud data, detect vertical clusters of the point cloud data based on the 2D occupancy images, and determine whether the vertical clusters of the point cloud data represent pole-like objects.

* * * * *